(12) United States Patent
Dong et al.

(10) Patent No.: US 12,524,838 B2
(45) Date of Patent: Jan. 13, 2026

(54) IMAGE GENERATION METHOD AND APPARATUS AND ELECTRONIC DEVICE

(71) Applicant: HUAWEI TECHNOLOGIES CO., LTD., Guangdong (CN)

(72) Inventors: Siwei Dong, Shenzhen (CN); Hui Yang, Beijing (CN); Baoyang Chen, Shenzhen (CN); Jia Hu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 215 days.

(21) Appl. No.: 18/335,416

(22) Filed: Jun. 15, 2023

(65) Prior Publication Data

US 2023/0325999 A1    Oct. 12, 2023

Related U.S. Application Data

(63) Continuation of application No. PCT/CN2020/136881, filed on Dec. 16, 2020.

(51) Int. Cl.
*G06T 5/50* (2006.01)
*G06T 5/90* (2024.01)
(Continued)

(52) U.S. Cl.
CPC .......... *G06T 5/50* (2013.01); *G06T 5/90* (2024.01); *H04N 5/265* (2013.01); *H04N 23/10* (2023.01);
(Continued)

(58) Field of Classification Search
None
See application file for complete search history.

(56) References Cited

U.S. PATENT DOCUMENTS

| 11,146,747 B1* | 10/2021 | Zhang | G06V 10/82 |
| 2007/0064119 A1* | 3/2007 | Komiya | H04N 25/11 |
| | | | 348/222.1 |

(Continued)

FOREIGN PATENT DOCUMENTS

WO    WO-2011107905 A1 *    9/2011    ........... G11B 27/031

OTHER PUBLICATIONS

Nguyen et al., "Training-Based Spectral Reconstruction from a Single RGB Image," Proceedings of 2015 18th International Conference, Sep. 24-27, 2015, 16 pages.
(Continued)

*Primary Examiner* — James M Hannett
(74) *Attorney, Agent, or Firm* — Fish & Richardson P.C.

(57) ABSTRACT

This application discloses example image generation methods and apparatuses, and example electronic devices. One example method includes acquiring one or more spectrum images of a first scene by using a first camera. One or more color images of a second scene can be acquired by using a second camera, wherein the one or more color images and the one or more spectrum images comprise a same target object, and a quantity of photosensitive bands of the first camera is not less than a quantity of photosensitive bands of the second camera. One or more color casts of one or more reconstructed spectrum images of the one or more color images can be corrected based on the one or more spectrum images, to acquire a plurality of corrected reconstructed spectrum images. The plurality of corrected reconstructed spectrum images can be fused to generate a corrected color image.

20 Claims, 15 Drawing Sheets

(51) Int. Cl.
*H04N 5/265* (2006.01)
*H04N 23/10* (2023.01)
*H04N 23/84* (2023.01)
*H04N 23/88* (2023.01)

(52) U.S. Cl.
CPC ............ *H04N 23/84* (2023.01); *H04N 23/88* (2023.01); *G06T 2207/10024* (2013.01); *G06T 2207/20081* (2013.01); *G06T 2207/20208* (2013.01); *G06T 2207/20221* (2013.01)

(56) References Cited

U.S. PATENT DOCUMENTS

2015/0229898 A1* 8/2015 Rivard .................. H04N 23/56
 348/223.1
2019/0253644 A1* 8/2019 Zhu ....................... H04N 23/74
2020/0357104 A1* 11/2020 Luo ........................... G06T 7/90

OTHER PUBLICATIONS

Kaya et al., "Towards Spectral Estimation from a Single RGB Image in the Wild," Proceedings of 2019 IEEE/CVF International Conference on Computer Vision Workshop (ICCVW), Oct. 27, 2019, pp. 3546-3555.
Extended European Search Report in European Appin. No. 20965456.5, mailed on Nov. 27, 2023, 11 pages.

* cited by examiner

IMAGE GENERATION METHOD AND APPARATUS AND ELECTRONIC DEVICE

CROSS-REFERENCE TO RELATED APPLICATIONS

This application is a continuation of International Application No. PCT/CN2020/136881, filed on Dec. 16, 2020, the disclosure of which is hereby incorporated by reference in its entirety.

TECHNICAL FIELD

This application relates to the field of image processing, and in particular, to an image generation method and apparatus, and an electronic device.

BACKGROUND

Currently, a conventional camera can photograph a same scene by using different exposure duration. A high dynamic range image that has a wider dynamic range and richer details, and that is closer to a natural scene is acquired by screening a pixel of an effective region in each image based on a preset range of a pixel value, eliminating overexposed and underexposed pixels, and fusing a plurality of images with different exposure amounts. That is, a high dynamic range imaging (HDRI) technology is used to restore real illumination of the natural scene in a color image generated by the conventional camera as much as possible. However, the conventional camera has three red, green and blue photosensitive bands, and cannot capture and record light of another photosensitive band in nature. A color of the color image photographed by the conventional camera is different from a color in a real scene. If a color cast exists in the plurality of fused images with different exposure amounts, a color of the generated high dynamic range image is also different from the color in the real scene. Because a multispectral sensor can acquire light of a plurality of photosensitive bands, the multispectral sensor can acquire a multispectral image with rich colors, that is, an image including object image information of spectrum images of a plurality of photosensitive bands. However, the multispectral sensor has low spatial resolution and a low imaging speed. Consequently, in photography applications, it is not suitable to present the multispectral image or a color image generated based on the multispectral image to a user. Therefore, how to make the color of the generated high dynamic range image as close as possible to the color of the real scene is an urgent problem to be resolved.

SUMMARY

This application provides an image generation method and apparatus, and an electronic device, to resolve a problem of how to make a color of a generated high dynamic range image as close as possible to a color of a real scene.

According to a first aspect, this application provides an image generation method. The method may be applied to an electronic device. Alternatively, the method may be applied to an image generation apparatus that can support an electronic device to implement the method. The method specifically includes: After the electronic device receives a photographing instruction of a user, a first camera and a second camera photograph a same target object. To be specific, the first camera acquires a spectrum image of a first scene, and the second camera acquires a color image of the second scene. Both the acquired color image and the acquired spectrum image include the same target object. Because a quantity of photosensitive bands of the first camera is not less than a quantity of photosensitive bands of the second camera, the spectrum image includes more color information than the color image. Further, the electronic device corrects a color cast of a reconstructed spectrum image of the color image based on the spectrum image, to acquire a plurality of corrected reconstructed spectrum images, and fuses the plurality of corrected reconstructed spectrum images to generate a corrected color image, so that a color of the corrected color image is closer to a color of the second scene than a color of the color image.

In this way, the second camera and the first camera that has more photosensitive bands than the second camera are combined, rich spectral information included in the spectrum image acquired by the first camera is fully used to assist in correcting the reconstructed spectrum image of the color image in a spectral domain, and then the corrected reconstructed spectrum images are fused to generate the corrected color image, that is, compared with the color image acquired by the second camera, a high dynamic range color image with a more refined and accurate color is acquired. The image generation method provided in this application may be applied to the fields such as mobile phone photography, remote sensing imaging, artwork storage and reproduction, and medical imaging, to effectively improve image imaging quality and user photography experience.

Both the first camera and the second camera are rear-facing cameras. Alternatively, both the first camera and the second camera are front-facing cameras.

In a specific implementation process, the first camera and the second camera may be implemented by different cameras, and two cameras are presented externally. In some embodiments, the first camera and the second camera may be located in different modules and operate independently. In some other embodiments, the first camera and the second camera may be located in a same module.

In another possible design, the first camera and the second camera may alternatively be integrated inside the electronic device, and only one camera is presented externally. To be specific, the first camera and the second camera are located on different chips under a same lens of a same module, and a driver module of a camera controls operating statuses of the first camera and the second camera, to acquire the color image and the spectrum image. Alternatively, a conventional RGB pixel and a spectral pixel of another photosensitive band may be designed on a same chip through different pixel arrangements, and a driver module controls operating statuses of a pixel of a multispectral sensor and a pixel of an RGB sensor, to acquire the color image and the spectrum image. In this way, a same camera may photograph the same target object within a period of time through different parameter configurations, to correct the color cast of the reconstructed spectrum image of the color image based on the spectrum image, and further acquire a high dynamic range color image with a more refined and accurate color.

In a possible implementation, the correcting a color cast of a reconstructed spectrum image of the color image based on the spectrum image, to acquire a plurality of corrected reconstructed spectrum images includes: correcting a pixel value of a matched pixel in the reconstructed spectrum image based on a pixel value of the spectrum image, to acquire the plurality of corrected reconstructed spectrum images. The matched pixel is a pixel that has a same image feature as the spectrum image and that is in an image overlapping region between the reconstructed spectrum image and the spectrum image. Therefore, the reconstructed spectrum image is corrected based on a pixel granularity. This effectively improves precision and accuracy of correcting the reconstructed spectrum image.

It may be understood that the spectrum image includes spectrum images of N photosensitive bands, the color image includes M frames of color images, each frame of color image has a different exposure amount, the reconstructed spectrum image includes M×N reconstructed spectrum images, the M×N reconstructed spectrum images include spectrum images of N photosensitive bands of each of the M frames of color images, and both N and M are integers greater than or equal to 1, Specifically, the correcting a pixel value of a matched pixel in the reconstructed spectrum image based on a pixel value of the spectrum image, to acquire the plurality of corrected reconstructed spectrum images includes: correcting, for a pixel value of a spectrum image of each of the N photosensitive bands, pixel values of matched pixels of a same photosensitive band in the M×N reconstructed spectrum images, to acquire M×N corrected reconstructed spectrum images. The plurality of corrected reconstructed spectrum images include the M×N corrected reconstructed spectrum images.

It may be understood that the M×N reconstructed spectrum images are divided, by each of the N photosensitive bands, into N reconstructed spectrum image sets. One reconstructed spectrum image set includes M reconstructed spectrum images having a same photosensitive band. Reconstructed spectrum images included in different reconstructed spectrum image sets have different photosensitive bands. Then, a pixel value of a matched pixel of each reconstructed spectrum image in the reconstructed spectrum image set is corrected based on a pixel value of a spectrum image of a same photosensitive band as the photosensitive band of the reconstructed spectrum image set. Reconstructed spectrum images included in the N reconstructed spectrum image sets are corrected, to acquire the M×N corrected reconstructed spectrum images.

Optionally, the correcting, for a pixel value of a spectrum image of each of the N photosensitive bands, pixel values of matched pixels of a same photosensitive band in the M×N reconstructed spectrum images includes: correcting, for the pixel value of the spectrum image of each of the N photosensitive bands, pixel values of matched pixels of a same photosensitive band in effective regions of the M×N reconstructed spectrum images. The effective region is a region that is in the color image and whose pixel value falls within a preset range, and a range of the effective region of the reconstructed spectrum image is the same as a range of an effective region of the color image. Therefore, a meaningless pixel value in the reconstructed spectrum image is removed, and a pixel value of a pixel that matches the spectrum image and that is in the effective region is corrected. This improves an image processing rate.

In another possible implementation, the fusing the plurality of corrected reconstructed spectrum images to generate a corrected color image includes: fusing, for each of the N photosensitive bands, corrected reconstructed spectrum images of a same photosensitive band in M×N corrected reconstructed spectrum images, to acquire N fused spectrum images; and generating the corrected color image based on the N fused spectrum images.

It may be understood that the M×N reconstructed spectrum images are divided, by each of the N photosensitive bands, into N reconstructed spectrum image sets, and corrected reconstructed spectrum images in each corrected reconstructed spectrum image set are fused. For each of the N photosensitive bands, one fused spectrum image is acquired, and finally the N fused spectrum images are acquired.

Therefore, reconstructed spectrum images of color images with different exposure duration are corrected, to acquire corrected reconstructed spectrum images within the different exposure duration. Further, the corrected reconstructed spectrum images are fused in the spectral domain to acquire a fused spectrum image with a high dynamic range, and a high dynamic range color image with a more refined and accurate color is generated based on the fused spectrum image.

In another possible implementation, the fusing the plurality of corrected reconstructed spectrum images to generate a corrected color image includes: generating, for each of M pieces of exposure duration, M intermediate color images based on the M×N corrected reconstructed spectrum images; and fusing the M intermediate color images to acquire a corrected high dynamic range color image.

It may be understood that the M×N corrected reconstructed spectrum images are divided, by each of the M pieces of exposure duration, into M corrected reconstructed spectrum image sets. N corrected reconstructed spectrum images included in one corrected reconstructed spectrum image set are acquired based on a color image with one piece of exposure duration. Corrected reconstructed spectrum images included in different corrected reconstructed spectrum image sets are acquired based on color images with different exposure duration. Then, one intermediate color image is generated based on the corrected reconstructed spectrum image included in one corrected reconstructed spectrum image set, to finally acquire the M intermediate color images. The M intermediate color images are fused to acquire the corrected high dynamic range color image.

In another possible implementation, the method further includes: generating, based on the M frames of color images, reconstructed spectrum images of N photosensitive bands of each frame of color image by using a reconstruction model, to acquire the M×N reconstructed spectrum images.

The electronic device can train the reconstruction model based on a sample color image and a sample spectrum image, and calculate a loss function based on the sample spectrum image and a predicted reconstructed spectrum image output by the reconstruction model. When the loss function converges and a value of the loss function is less than or equal to a threshold, a parameter of the reconstruction model that is used to generate the predicted reconstructed spectrum image output by the reconstruction model is determined as a parameter of the reconstruction model that is finally used to generate the reconstructed spectrum image based on the color image.

According to a second aspect, an image generation apparatus is provided. For beneficial effect, refer to the descriptions of the first aspect. Details are not described herein again. The image generation apparatus has a function of implementing behavior in the method embodiment in the first aspect. The function may be implemented by hardware, or may be implemented by hardware executing corresponding software. The hardware or the software includes one or more modules corresponding to the foregoing function. In a possible design, the image generation apparatus includes an acquisition module and an image generation module. The acquisition module is configured to acquire a spectrum image of a first scene and acquire a color image of a second scene. Both the color image and the spectrum image include a same target object. A quantity of photosensitive bands used by the acquisition module to acquire the first scene is not less than a quantity of photosensitive bands used by the acquisition module to acquire the second scene. The image generation module is configured to: correct a color cast of a reconstructed spectrum image of the color image based on the spectrum image, to acquire a plurality of corrected reconstructed spectrum images; and fuse the plurality of corrected reconstructed spectrum images to generate a corrected color image.

In a possible implementation, when correcting the color cast of the reconstructed spectrum image of the color image based on the spectrum image, to acquire the plurality of corrected reconstructed spectrum images, the image generation module is specifically configured to: correct a pixel value of a matched pixel in the reconstructed spectrum image based on a pixel value of the spectrum image, to acquire the plurality of corrected reconstructed spectrum images. The matched pixel is a pixel that has a same image feature as the spectrum image and that is in an image overlapping region between the reconstructed spectrum image and the spectrum image.

It may be understood that the spectrum image includes spectrum images of N photosensitive bands, the color image includes M frames of color images, each frame of color image has a different exposure amount, the reconstructed spectrum image includes M×N reconstructed spectrum images, the M×N reconstructed spectrum images include spectrum images of N photosensitive bands of each of M frames of color images, and both N and M are integers greater than or equal to 1.

Specifically, when correcting the pixel value of the matched pixel in the reconstructed spectrum image based on the pixel value of the spectrum image, to acquire the plurality of corrected reconstructed spectrum images, the image generation module is specifically configured to: correct, for a pixel value of a spectrum image of each of the N photosensitive bands, pixel values of matched pixels of a same photosensitive band in the M×N reconstructed spectrum images, to acquire M×N corrected reconstructed spectrum images. The plurality of corrected reconstructed spectrum images include the M×N corrected reconstructed spectrum images.

Optionally, when correcting, for the pixel value of the spectrum image of each of the N photosensitive bands, the pixel values of the matched pixels of the same photosensitive band in the M×N reconstructed spectrum images, the image generation module is specifically configured to: correct, for the pixel value of the spectrum image of each of the N photosensitive bands, pixel values of matched pixels of a same photosensitive band in effective regions of the M×N reconstructed spectrum images. The effective region is a region that is in the color image and whose pixel value falls within a preset range, and a range of the effective region of the reconstructed spectrum image is the same as a range of an effective region of the color image.

In another possible implementation, when fusing the plurality of corrected reconstructed spectrum images to generate the corrected color image, the image generation module is specifically configured to: fuse, for each of the N photosensitive bands, corrected reconstructed spectrum images of a same photosensitive band in M×N corrected reconstructed spectrum images, to acquire N fused spectrum images; and generate the corrected color image based on the N fused spectrum images.

In another possible implementation, when fusing the plurality of corrected reconstructed spectrum images to generate the corrected color image, the image generation module is specifically configured to: generate M intermediate color images based on M×N corrected reconstructed spectrum images; and fuse the M intermediate color images to acquire the corrected color image.

In another possible implementation, the image generation module is further configured to generate, based on the M frames of color images, reconstructed spectrum images of N photosensitive bands of each frame of color image by using a reconstruction model, to acquire the M×N reconstructed spectrum images. A parameter of the reconstruction model is determined by training the reconstruction model based on a sample color image and a sample spectrum image and calculating a loss function based on the sample spectrum image and a predicted reconstructed spectrum image output by the reconstruction model, and is determined when the loss function converges and a value of the loss function is less than or equal to a threshold.

According to a third aspect, a computing device is provided. The computing device includes at least one processor and a memory. The memory is configured to store a group of computer instructions. When executing the group of computer instructions, the processor performs operation steps of the image generation method in any one of the first aspect or the possible implementations of the first aspect.

According to a fourth aspect, a computer-readable storage medium is provided, including computer software instructions. When the computer software instructions are run in a computing device, the computing device is enabled to perform operation steps of the method in any one of the first aspect or the possible implementations of the first aspect.

According to a fifth aspect, a computer program product is provided. When the computer program product runs on a computer, the computer is enabled to perform operation steps of the method in any one of the first aspect or the possible implementations of the first aspect.

According to a sixth aspect, a chip system is provided. The chip system is applied to an electronic device. The chip system includes an interface circuit and a processor. The interface circuit and the processor are interconnected through a line. The interface circuit is configured to receive a signal from a memory of the electronic device, and send the signal to the processor, where the signal includes computer instructions stored in the memory. When the processor executes the computer instructions, the chip system performs operation steps of the method in any one of the first aspect or the possible implementations of the first aspect.

In this application, based on implementations provided in the foregoing aspects, the implementations may be further combined to provide more implementations.

DESCRIPTION OF EMBODIMENTS

For clear and brief description of the following embodiments, a related technology is briefly described first.

Figure 1:
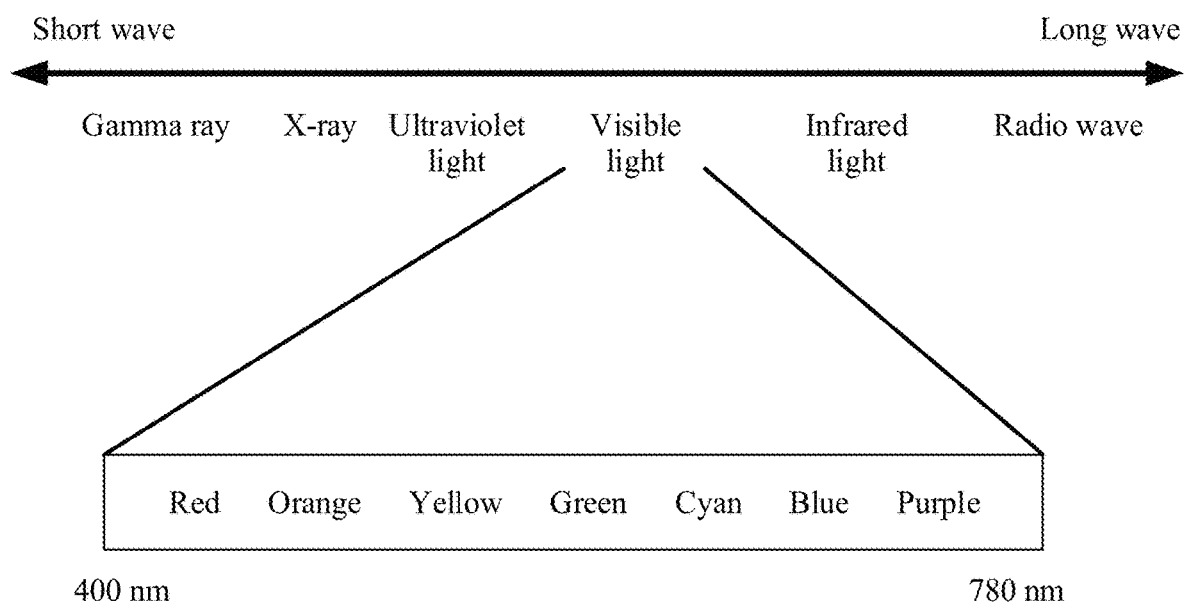
FIG. 1 is a schematic diagram of a spectrum according to an embodiment of this application.

An optical spectrum is briefly referred to as a spectrum. The spectrum is a pattern in which monochromatic light acquired by splitting polychromatic light by using a dispersion system (for example, a prism or a grating) is sequentially arranged by a wavelength (or a frequency). The spectrum includes a visible spectrum and an invisible spectrum. Electromagnetic radiation within a wavelength range of the visible spectrum is referred to as visible light. FIG. 1 is a schematic diagram of a spectrum according to an embodiment of this application. From short waves to long waves, they are a gamma ray, an X-ray, ultraviolet light, visible light, infrared light, and a radio wave. Generally, visible light that can be perceived by a human eye has a frequency of 380 terahertz to 750 terahertz (THz), and a wavelength of 400 nanometers to 780 nanometers (nm). Visible light perceived by different people may have slightly different frequencies and wavelengths. For example, some people can perceive visible light with a frequency of about 340 THz to 790 THz and a wavelength of about 380 nm to 880 nm. Electromagnetic waves with different frequencies cause different color perceptions of human eyes. After being dispersed by the prism or the grating, the visible light presents a visible continuous spectrum of red, orange, yellow, green, cyan, blue, and purple. A frequency and a wavelength of the visible continuous spectrum are shown in Table 1.

TABLE 1

| Color | Frequency | Wavelength |
| --- | --- | --- |
| Red | 385 THz to 482 THz | 780 nm to 622 nm |
| Orange | 482 THz to 503 THz | 622 nm to 597 nm |
| Yellow | 503 THz to 520 THz | 597 nm to 577 nm |
| Green | 520 THz to 610 THz | 577 nm to 492 nm |
| Cyan | 610 THz to 620 THz | 492 nm to 455 nm |
| Blue | 620 THz to 659 THz | 455 nm to 435 nm |
| Purple | 659 THz to 750 THz | 435 nm to 400 nm |

A multispectral technology is a spectrum detection technology that acquires a plurality of spectral bands at the same time or in a time division manner within a period of time, and extends the spectral bands from visible light to infrared light and ultraviolet light. The spectral band may also be referred to as a photosensitive band or a band. For example, within a period of time, a sensor may first capture a spectrum image of a first photosensitive band, then capture a spectrum image of a second photosensitive band, and finally capture a spectrum image of a third photosensitive band by switching different filters. In addition, a time interval for capturing the photosensitive band is short, and a location of a target object slightly changes. Further, spectrum images of a plurality of different photosensitive bands within a same short period of time may be acquired. A common multispectral sensor includes a plurality of optical splitting elements (for example, a filter or a spectroscope) and an imaging optical element. That one optical splitting element is sensitive to light of one photosensitive band may be understood as that one optical splitting element transmits light of one photosensitive band. Photosensitive bands of different optical splitting elements may partially overlap or may not overlap at all, which is not limited. For example, a photosensitive band of an optical splitting element 1 is 630 nm to 610 nm, a photosensitive band of an optical splitting element 2 is 620 nm to 600 nm, and an overlapping photosensitive band of the optical splitting element 1 and the optical splitting element 2 is 620 nm to 610 nm. For another example, a photosensitive band of an optical splitting element 1 is 630 nm to 610 nm, a photosensitive band of an optical splitting element 2 is 600 nm to 580 nm, and the photosensitive band of the optical splitting element 1 does not overlap with the photosensitive band of the optical splitting element 2. It may be understood that, if two optical splitting elements are sensitive to light of a same photosensitive band, it may be considered that both the two optical splitting elements transmit the light of the photosensitive band.

Figure 2:
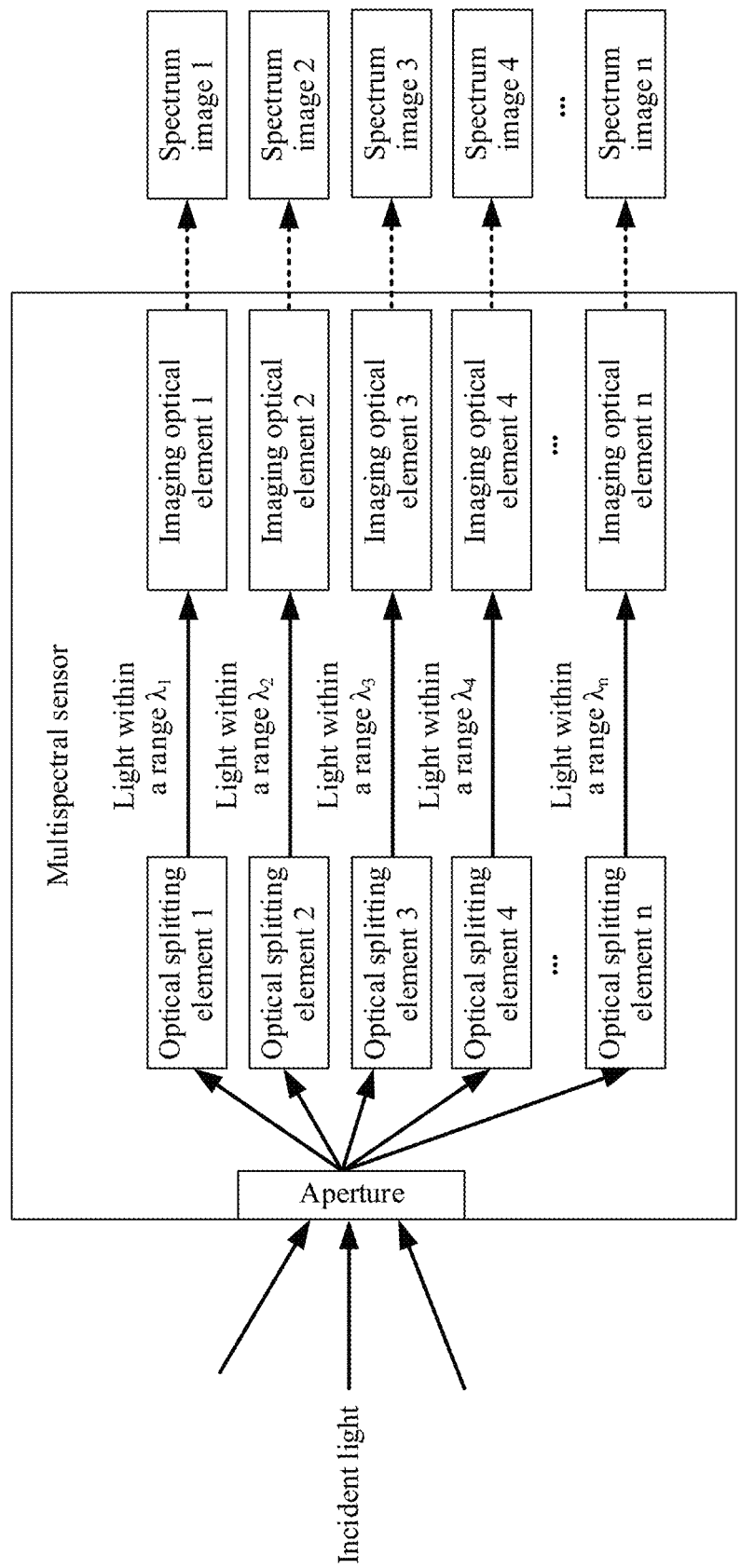
FIG. 2 is a schematic diagram of a simplified architecture of a multispectral sensor according to an embodiment of this application.

In some embodiments, a multispectral sensor may simultaneously acquire light of a plurality of photosensitive bands by using received incident light. FIG. 2 is a schematic diagram of a simplified architecture of the multispectral sensor according to an embodiment of this application. The multispectral sensor receives incident light through an aperture, the incident light passes through N optical splitting elements, and each optical splitting element transmits light within a photosensitive band range of the optical splitting element and reflects light outside the photosensitive band range of the optical splitting element. An imaging optical element behind each optical splitting element generates a spectrum image by using light that passes through the optical splitting element. The spectrum image is a gray image. The gray image is an image in which each pixel has only one sampling color. Typically, the gray image is displayed at a gray level from darkest black to brightest white. Therefore, the multispectral sensor may generate N spectrum images, that is, spectrum images of N photosensitive bands, where object image information of any two spectrum images is determined by light of different photosensitive bands. Further, the multi spectral sensor may also generate a multi spectral image with rich colors based on the N spectrum images. N is a positive integer.

In some other embodiments, a multispectral sensor receives incident light through an aperture, the incident light passes through one optical splitting element, and the optical splitting element transmits light within a photosensitive band range of the optical splitting element and reflects light outside the photosensitive band range of the optical splitting element. The multispectral sensor switches the optical splitting element, and then receives incident light through the aperture, the incident light passes through another optical splitting element, and the another optical splitting element transmits light within a photosensitive band range of the another optical splitting element and reflects light outside the photosensitive band range of the optical splitting element. Switching is sequentially performed, so that the multispectral sensor acquires light of a plurality of different photosensitive bands within a period of time.

It may be understood that a quantity of spectrum images generated by the multispectral sensor is determined based on a quantity of photosensitive bands supported by the multispectral sensor. A larger quantity of photosensitive bands supported by the multi spectral sensor indicates more spectrum images generated by the multi spectral sensor and richer color information included in multispectral images generated by the multispectral sensor. For example, if the multispectral sensor supports 204 photosensitive bands, the multispectral sensor may generate spectrum images of the 204 different photosensitive bands. The multispectral sensor uses the multispectral technology to acquire color information of light of more photosensitive bands than a conventional RGB camera.

An electronic device in embodiments of this application may be a smartphone, a digital camera, a television, a tablet computer, a projector, a desktop computer, a laptop computer, a handheld computer, a notebook computer, an ultra-mobile personal computer (UMPC), a netbook, or a device including a multispectral sensor and an RGB camera, such as a personal digital assistant (PDA), or an augmented reality (AR)/a virtual reality (VR) device. A specific form of the electronic device is not specifically limited in embodiments of this application.

Figure 3:
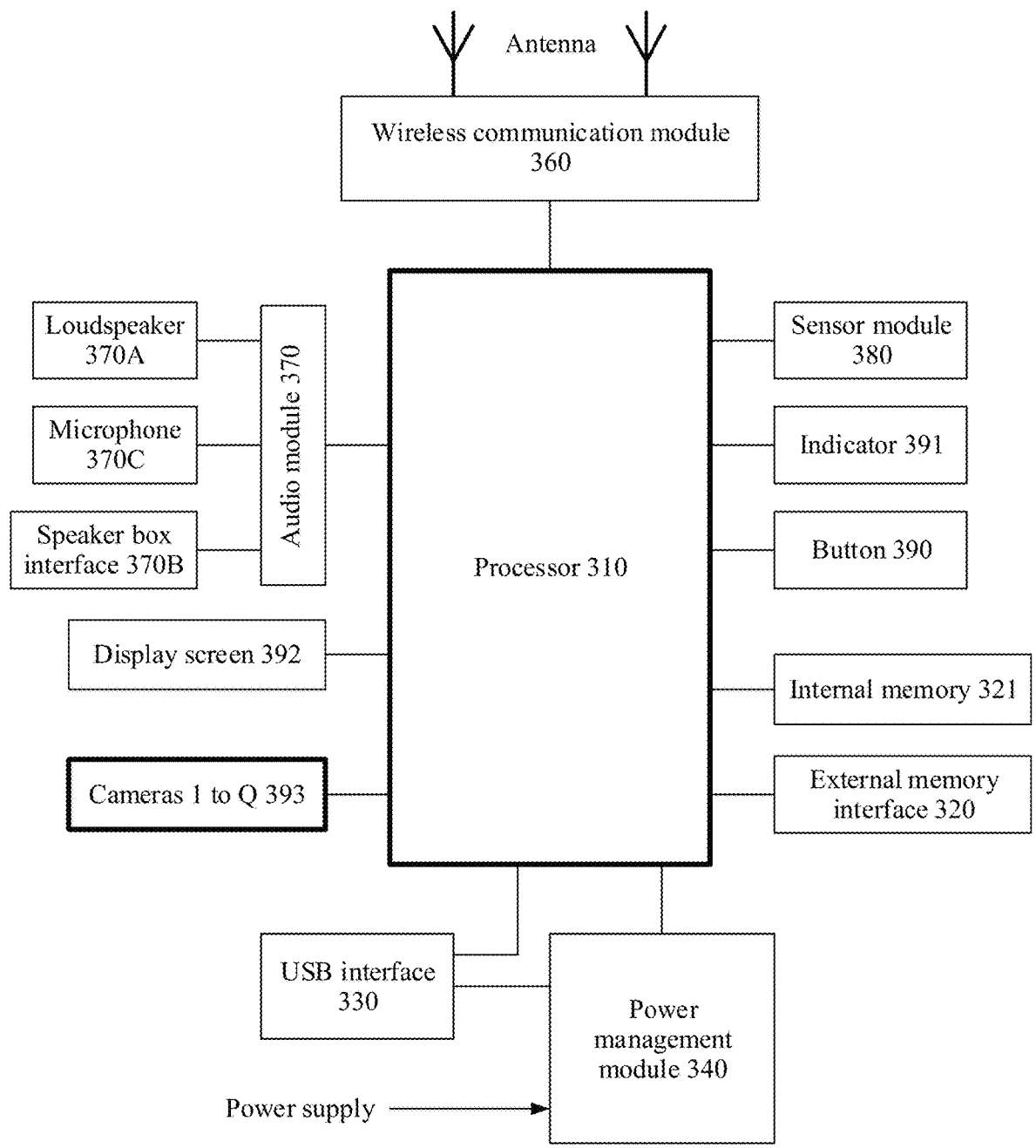
FIG. 3 is a schematic diagram of a structure of an electronic device according to an embodiment of this application.

FIG. 3 is a schematic diagram of a structure of an electronic device according to an embodiment of this application. As shown in FIG. 3, the electronic device includes: a processor 310, an external memory interface 320, an internal memory 321, a universal serial bus (USB) interface 330, a power management module 340, an antenna, a wireless communication module 360, an audio module 370, a loudspeaker 370A, a speaker box interface 370B, a microphone 370C, a sensor module 380, a button 390, an indicator 391, a display screen 392, a camera 393, and the like. The sensor module 380 may include a range sensor, an optical proximity sensor, a fingerprint sensor, a temperature sensor, a touch sensor, an ambient light sensor, and the like.

It may be understood that the structure shown in this embodiment does not constitute a specific limitation on the electronic device. In some other embodiments, the electronic device may include more or fewer components than those shown in the figure, or combine some components, or split some components, or have different component arrangements. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

In this embodiment, the processor 310 is configured to: receive, from the camera 393, a spectrum image and a color image that both include a same target object, correct a color cast of a reconstructed spectrum image of the color image based on the spectrum image, to acquire a plurality of corrected reconstructed spectrum images, and fuse the plurality of corrected reconstructed spectrum images to generate a corrected color image, so that a color of the corrected color image is closer to a color of a real scene than a color of the color image. The color cast is a deviation between a color of an image and the color of the real scene.

The controller may be a nerve center and a command center of the electronic device. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces waiting time of the processor 310, thereby improving system efficiency.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a USB interface, and/or the like.

The power management module 340 is configured to connect to a power supply. The power management module 340 may be further connected to the processor 310, the internal memory 321, the display screen 392, the camera 393, the wireless communication module 360, and the like. The power management module 340 receives an input of the power supply, and supplies power to the processor 310, the internal memory 321, the display screen 392, the camera 393, the wireless communication module 360, and the like. In some other embodiments, the power management module 340 may alternatively be disposed in the processor 310.

A wireless communication function of the electronic device may be implemented by using the antenna, the wireless communication module 360, and the like. The wireless communication module 360 may provide a wireless communication solution that is applied to the electronic device and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology.

The wireless communication module 360 may be one or more components integrating at least one communication processing module. The wireless communication module 360 receives an electromagnetic wave through the antenna, performs frequency modulation and filtering processing on an electromagnetic wave signal, and sends a processed signal to the processor 310. The wireless communication module 360 may further receive a to-be-sent signal from the processor 310, perform frequency modulation and amplification on the signal, and convert a processed signal into an electromagnetic wave for radiation through the antenna. In some embodiments, the antenna of the electronic device is coupled to the wireless communication module 360, so that the electronic device may communicate with a network and another device by using a wireless communication technology.

The electronic device implements a display function by using the GPU, the display screen 392, the application processor, and the like. The GPU is a microprocessor for image processing, and is connected to the display screen 392 and the application processor. The GPU is configured to: perform mathematical and geometric computation, and render an image. The processor 310 may include one or more GPUs that execute program instructions to generate or change display information.

The display screen 392 is configured to display an image, a video, and the like. The display screen 392 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like.

The electronic device may implement a photographing function by using the ISP, the camera 393, the video codec, the GPU, the display screen 392, the application processor, and the like. The ISP is configured to process data fed back by the camera 393. In some embodiments, the ISP may be disposed in the camera 393.

The camera 393 is configured to capture a static image or a video. An optical image of an object is generated by using the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include Q cameras 393, where Q is a positive integer greater than 2.

Figure 4:
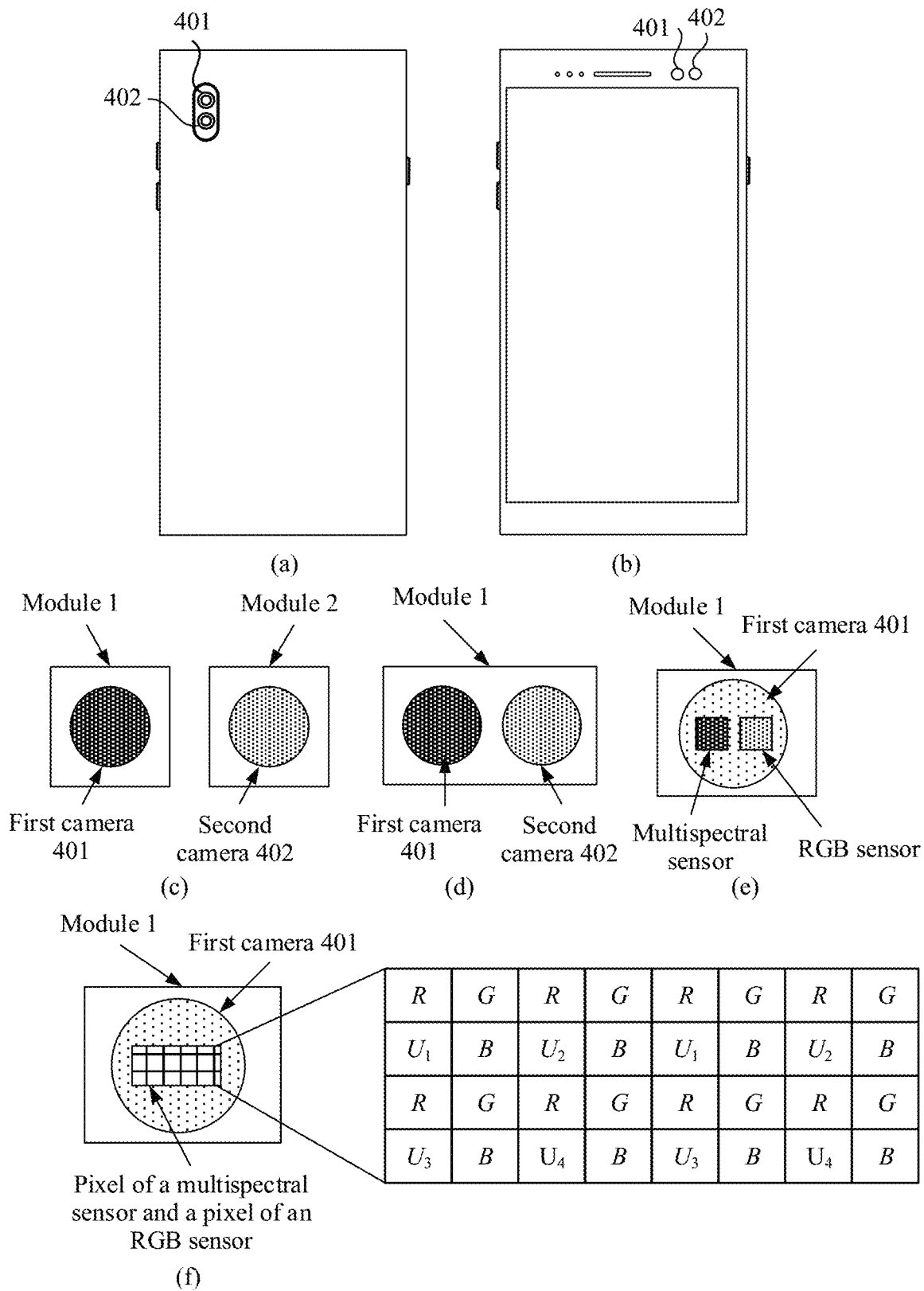
FIG. 4 is a schematic diagram of a location of a camera according to an embodiment of this application.

In this embodiment, the electronic device includes at least a first camera and a second camera. The first camera can acquire light of more photosensitive bands than the second camera. The first camera is configured to acquire a spectrum image. The second camera is configured to acquire a color image. For example, the first camera is a multispectral sensor or a hyperspectral sensor. The second camera is a camera having three red, green and blue (RGB) photosensitive bands. Locations of the first camera and the second camera on the electronic device are not limited in this embodiment. For example, the electronic device is a smartphone, and the first camera and the second camera are located on a same side of the smartphone. FIG. 4 is a schematic diagram of a location of a camera according to an embodiment of this application. As shown in (a) in FIG. 4, the first camera 401 is a rear-facing camera, and the second camera 402 is a rear-facing camera. As shown in (b) in FIG. 4, the first camera 401 is a front-facing camera, and the second camera 402 is a front-facing camera.

Inside the electronic device, the first camera and the second camera may be located in different modules and operate independently. As shown in (c) in FIG. 4, the first camera 401 is located in a module 1, and the second camera 402 is located in a module 2.

In some other embodiments, the first camera and the second camera may be located in a same module, and a driver module (for example, the processor 310) controls operating statuses of the first camera and the second camera. The first camera and the second camera may operate at the same time to acquire a color image and a spectrum image, or only either of the first camera and the second camera may be started. As shown in (d) in FIG. 4, both the first camera 401 and the second camera 402 are located in the module 1.

Optionally, the first camera and the second camera may alternatively be integrated inside the electronic device, and only one camera is presented externally. To be specific, the first camera and the second camera are located on different chips under a same lens of a same module, and a driver module (for example, the processor 310) controls operating statuses of the first camera and the second camera. The first camera and the second camera may operate at the same time to acquire a color image and a spectrum image, or only either of the first camera and the second camera may be started. Incident light acquired by the externally presented camera is separately processed by the first camera and the second camera, to acquire a spectrum image and a color image. As shown in (e) in FIG. 4, the electronic device presents the first camera 401 externally. Inside the electronic device, a multispectral sensor and an RGB sensor are integrated into the module 1.

In some other embodiments, a conventional RGB pixel and a spectral pixel of another photosensitive band may be designed on a same chip through different pixel arrangements, and a driver module (for example, the processor 310) controls a pixel of a multispectral sensor and a pixel of an RGB sensor. The pixel of the multispectral sensor and the pixel of the RGB sensor may operate at the same time. Alternatively, an RGB pixel may operate or only a spectral pixel may operate. When only one pixel is used to operate, a value of a location of a pixel that does not operate is calculated according to a spatial interpolation algorithm, to acquire a pixel value of a full array.

As shown in (f) in FIG. 4, the electronic device presents the first camera 401 externally. Inside the electronic device, a pixel of the multispectral sensor and a pixel of the RGB sensor are integrated into the module 1. There are three types of RGB pixels: a red pixel R, a green pixel G, and a blue pixel B. There are four types of spectral pixels: a spectral pixel $U_1$ of a photosensitive band $\lambda_1$, a spectral pixel $U_2$ of a photosensitive band $\lambda_2$, a spectral pixel $U_3$ of a photosensitive band $\lambda_3$, and a spectral pixel $U_4$ of a photosensitive band $\lambda_4$.

Alternatively, the electronic device may not include a camera, in other words, the camera 393 is not disposed in the electronic device (for example, a television). The electronic device may be externally connected to the camera 393 through an interface (for example, a USB interface 330). The external camera 393 may be fastened to the electronic device by using an external fastener (for example, a camera bracket with a clip). For example, the external camera 393 may be fastened to an edge of the display screen 392 of the electronic device, for example, an upper-side edge, by using the external fastener.

The digital signal processor is configured to process a digital signal, and may process another digital signal in addition to a digital image signal. For example, when the electronic device selects a frequency, the digital signal processor is configured to perform Fourier transformation on frequency energy. The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) computing processor. The NPU quickly processes input information based on a structure of a biological neural network, for example, based on a transfer mode between human brain neurons; and may further continuously perform self-learning. The NPU can implement applications such as intelligent cognition of the electronic device, for example, image recognition, facial recognition, voice recognition, and text understanding.

The external memory interface 320 may be configured to connect to an external storage card, for example, a micro SD card, to extend a storage capability of the electronic device. The external storage card communicates with the processor 310 through the external memory interface 320, to implement a data storage function. For example, files such as music and videos are stored in the external memory card.

The internal memory 321 may be configured to store computer-executable program code, and the executable program code includes instructions. The processor 310 executes various function applications and data processing of the electronic device by running the instructions stored in the internal memory 321. The internal memory 321 may include a program storage area and a data storage area. The program storage area may store an operating system, an application required by at least one function (for example, a sound playing function or an image playing function), and the like. The data storage area may store data (for example, audio data) and the like created when the electronic device is used. In addition, the internal memory 321 may include a high-speed random access memory, and may further include a nonvolatile memory, for example, at least one magnetic disk storage device, a flash memory, or a universal flash storage (UFS).

The electronic device may implement an audio function such as music playing and recording by using the audio module 370, the loudspeaker 370A, the microphone 370C, the speaker box interface 370B, the application processor, and the like. In this embodiment, the microphone 370C may be configured to receive a voice instruction sent by a user to the electronic device. The loudspeaker 370A may be configured to feed back the voice instruction of the electronic device to the user.

The audio module 370 is configured to convert digital audio information into an analog audio signal for output, and is also configured to convert an analog audio input into a digital audio signal. The audio module 370 may further be configured to code and decode an audio signal. In some embodiments, the audio module 370 may be disposed in the processor 310, or some functional modules in the audio module 370 are disposed in the processor 310. The loudspeaker 370A, also referred to as a "horn", is configured to convert an audio electrical signal into a sound signal. The microphone 370C, also referred to as a "mike" or a "mic", is configured to convert a sound signal into an electrical signal.

The speaker box interface 370B is configured to connect to a wired speaker box. The speaker box interface 370B may be the USB interface 330, or may be a 3.5 mm open mobile terminal platform (OMTP) standard interface, or a cellular telecommunications industry association of the USA (CTIA) standard interface.

The button 390 includes a power button, a volume button, and the like. The button 390 may be a mechanical button, or may be a touch button. The electronic device may receive a button input, and generate a button signal input related to user settings and function control of the electronic device.

The indicator 391 may be an indicator light, and may be configured to indicate that the electronic device is in a power-on mode, a standby mode, a power-off mode, or the like. For example, if the indicator light is off, it may indicate that the electronic device is in the power-off mode; if the indicator light is green or blue, it may indicate that the electronic device is in the power-on mode; or if the indicator light is red, it may indicate that the electronic device is in the standby mode.

It may be understood that the structure shown in this embodiment of this application does not constitute a specific limitation on the electronic device. The electronic device may have more or fewer components than those shown in FIG. 3, may combine two or more components, or may have different component configurations. For example, the electronic device may further include components such as a speaker box. The components shown in FIG. 3 may be implemented in hardware, software, or a combination of hardware and software including one or more signal processing or application-specific integrated circuits.

All methods in the following embodiments may be implemented in the electronic device having the foregoing hardware structure. In the following embodiments, an example in which the electronic device is a smartphone is used to describe the method in embodiments of this application.

Figure 5A:
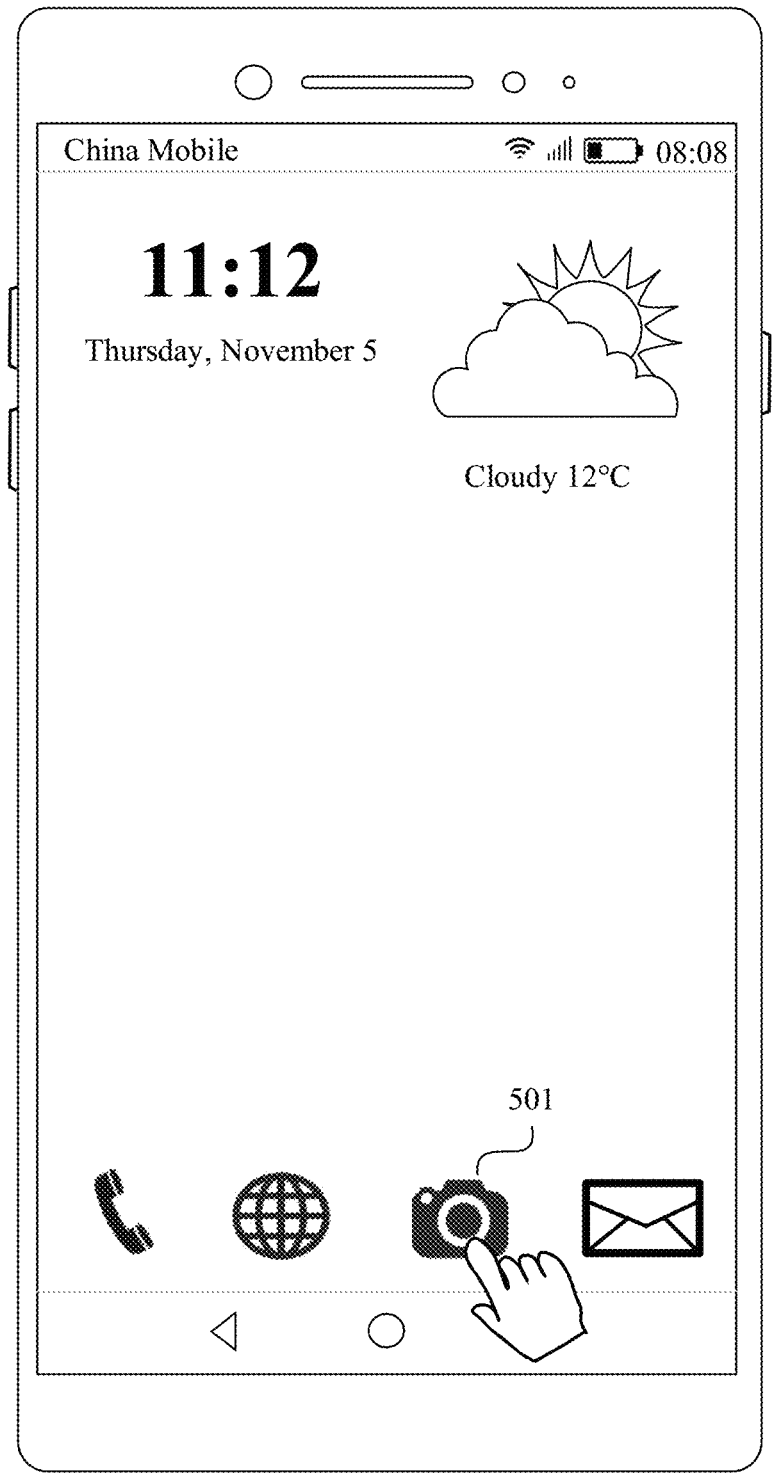
FIG. 5($a$), FIG. 5($b$), FIG. 5($c$), and FIG. 5($d$) each are an example diagram of a photographing interface according to an embodiment of this application.
Figure 5B:
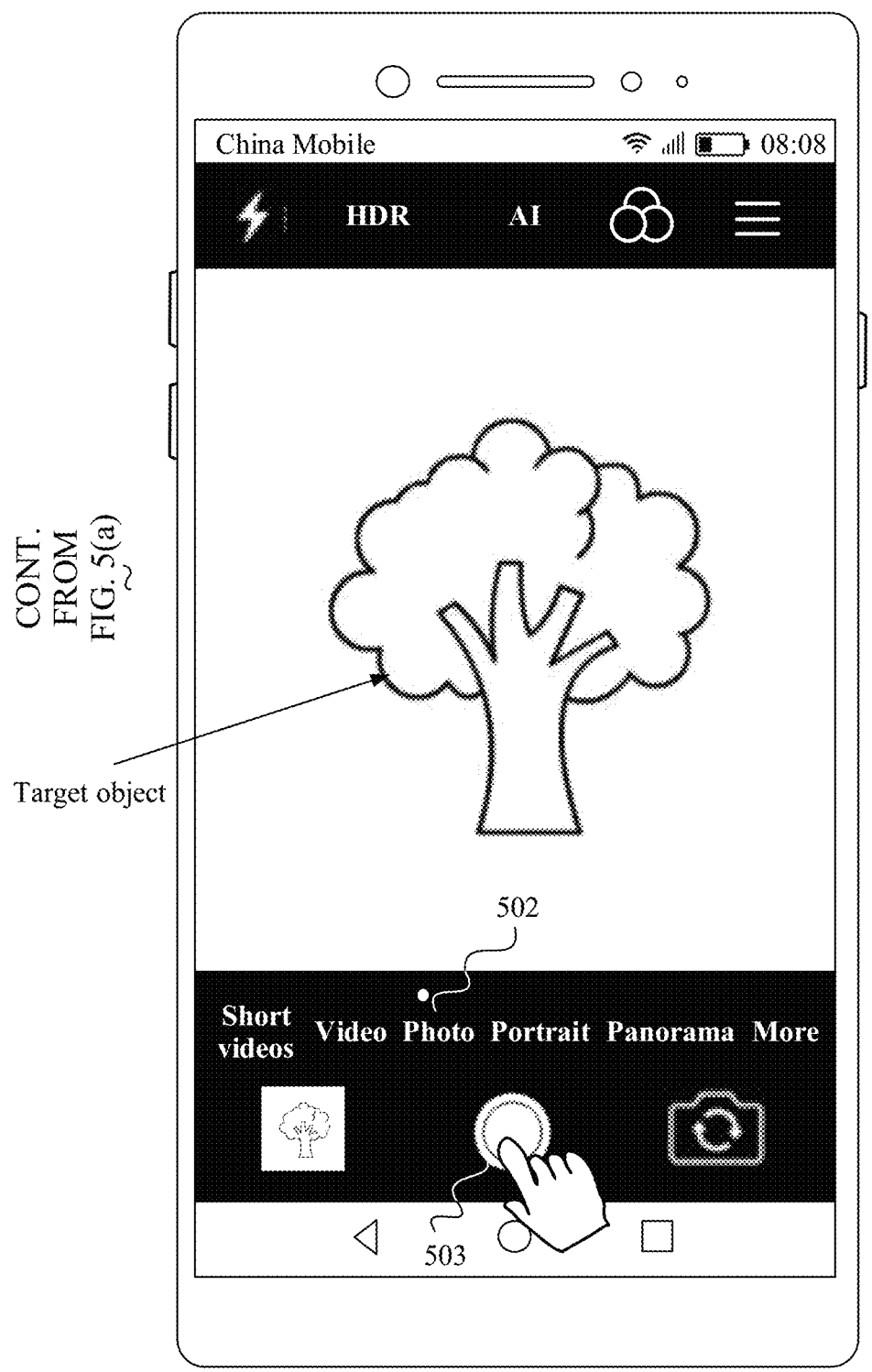
Figure 5C:
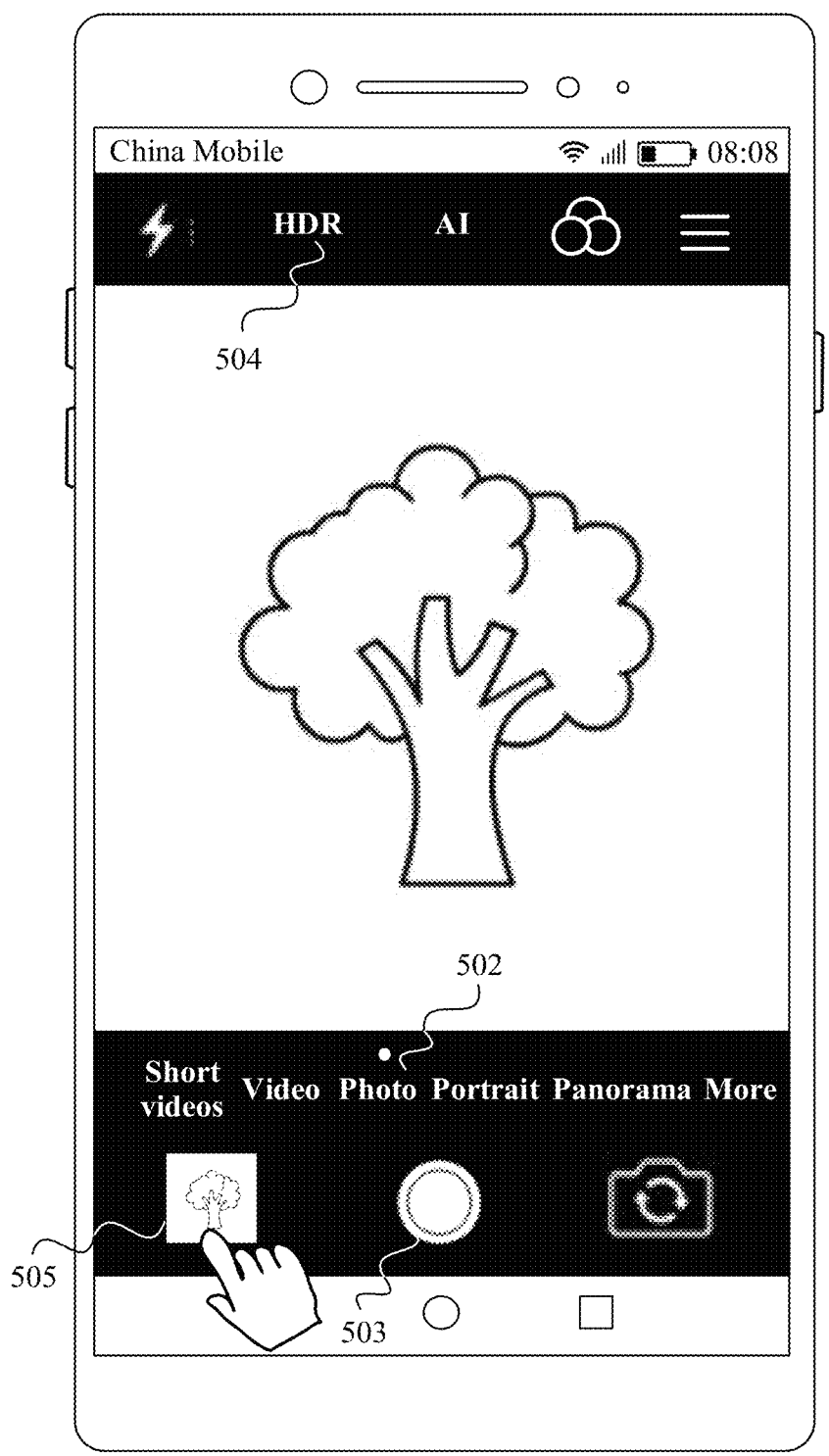

It is assumed that the user uses a smartphone to photograph a same target object, and the smartphone carries a first camera and a second camera. FIG. 5(a), FIG. 5(b), FIG. 5(c), and FIG. 5(d) each are an example diagram of a photographing interface according to an embodiment of this application. FIG. 5(a) is a schematic front view of a smartphone according to an embodiment of this application. A camera application (APP) icon 501 is displayed on a display screen of the smartphone, and the user may tap the camera application icon 501. A touch sensor included in the smartphone receives a touch operation, and reports the touch operation to a processor, so that the processor starts the camera application in response to the touch operation. In addition, in this embodiment of this application, the smartphone may alternatively start the camera application in another manner, and display a user interface of the camera application on the display screen. For example, when a user interface is displayed after a screen is off, a lock screen is displayed or the screen is unlocked, in response to a voice instruction or a shortcut operation of the user, the smartphone may start the camera application, and display the user interface of the camera application on the display screen. As shown in FIG. 5(b), the smartphone responds to a tap operation, and the user interface of the camera application is displayed on the display screen of the smartphone. The user interface includes mode options such as "Short videos", "Video", "Photo", "Portrait", and "Panorama", a "Preview" function button, a "Photo" function button and a function button of "switching between front and rear cameras". The user may first select the "Photo" mode 502, and then tap the "Photo" function button 503. The smartphone automatically turns on the first camera and the second camera in response to the tapping operation. The first camera acquires a spectrum image of the target object, and the second camera acquires a color image of the target object. The processor of the smartphone corrects a color cast of a reconstructed spectrum image of the color image based on the spectrum image, to acquire a plurality of corrected reconstructed spectrum images, and fuses the plurality of corrected reconstructed spectrum images to generate a corrected color image, so that a color of the corrected color image is closer to a color of a real scene than a color of the color image. In this way, the second camera and the first camera that has more photosensitive bands than the second camera are combined, rich spectral information included in the spectrum image acquired by the first camera is fully used to assist in correcting the reconstructed spectrum image of the color image in a spectral domain, and then the corrected reconstructed spectrum images are fused to generate the corrected color image, that is, compared with the color image acquired by the second camera, a high dynamic range color image with a more refined and accurate color is acquired. Further, as shown in FIG. 5(c), the user may tap the "Preview" function button 505 to view the photographed image that includes the target object.

Figure 5D:
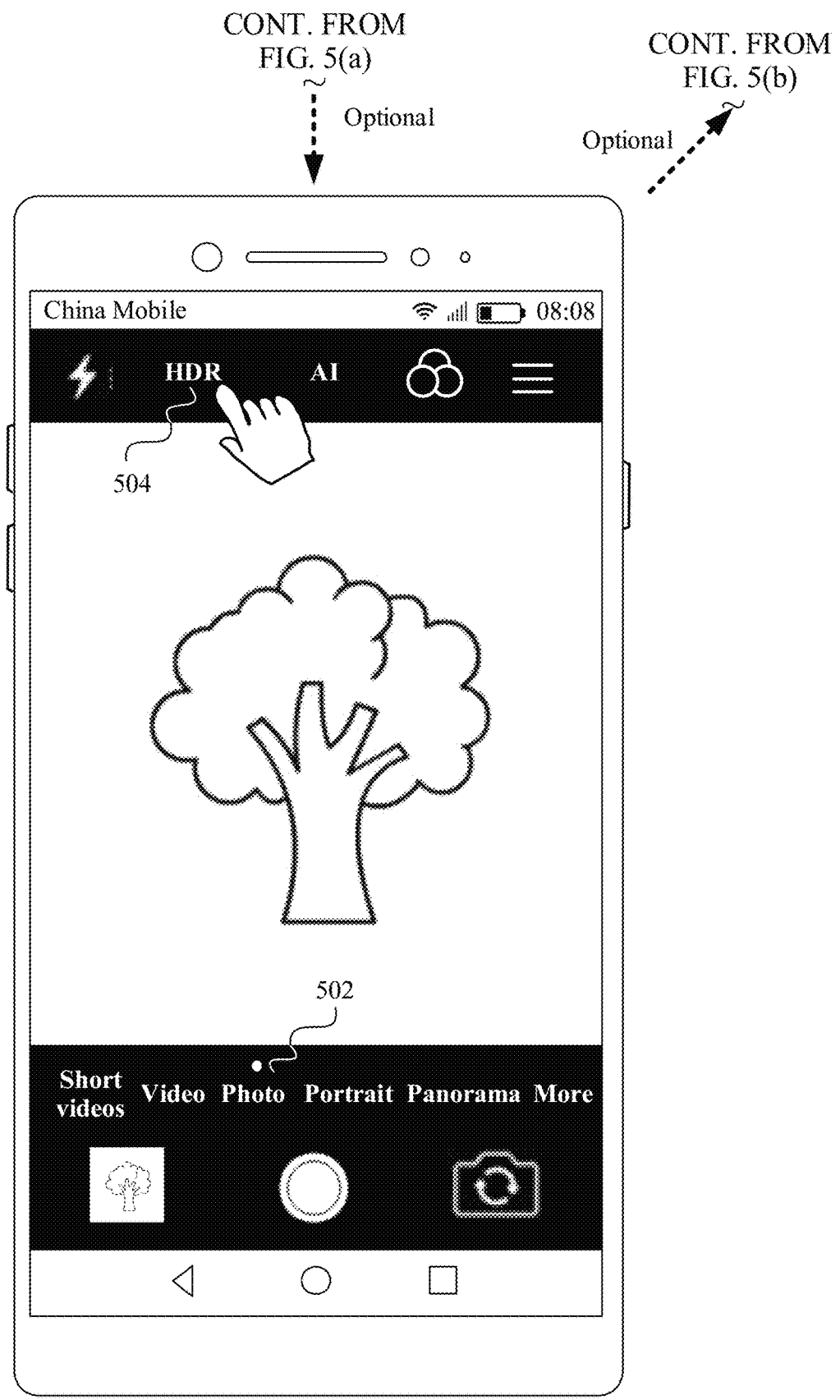

The foregoing embodiment is described by using an example in which the smartphone automatically starts the first camera and the second camera during photographing, to perform color correction on the photographed image by default. In some other embodiments, as shown in FIG. 5(d), a "Color correction" function button 504 may alternatively be displayed on the user interface of the camera application, and the user determines whether to perform color correction on the photographed image. After selecting the "Photo" mode 502, the user may further tap the "Color correction" function button 504, and then tap the "Photo" function button 503. The smartphone starts the first camera and the second camera in response to the tapping operation, the first camera acquires the spectrum image of the target object, and the second camera acquires the color image of the target object, so that the processor of the smartphone performs color correction on the color image based on the spectrum image. After selecting the "Photo" mode 502, if the user does not tap the "Color correction" function button 504, but taps the "Photo" function button 503, the smartphone does not start the first camera but starts the second camera in response to the tapping operation, and the second camera acquires the color image of the target object, so that the processor of the smartphone does not perform color correction on the color image.

Next, an image generation method provided in this embodiment is described in detail with reference to FIG. 6. An apparatus for correcting a color cast of a reconstructed spectrum image of a color image and generating a corrected color image through fusion is not limited herein. For example, the apparatus may be a processor in a photographing module that includes a first camera and a second camera, or may be another processor in an electronic device. The first camera is a multispectral sensor or a hyperspectral sensor. The second camera is a camera having three red, green and blue (RGB) photosensitive bands. The first camera and the second camera may be located in a same photographing module, or the first camera and the second camera are located in different independent photographing modules. For specific explanations, refer to the descriptions in the foregoing embodiments.

S601: The first camera acquires a spectrum image of a first scene.

S602: The second camera acquires a color image of the second scene.

It may be understood that when a user uses a smartphone to photograph a real scene, the first camera and the second camera respectively photograph images of the real scene within a time interval. The time interval may be a time interval in seconds or a time interval in milliseconds. In some embodiments, if the time interval is 0 seconds, that is, the first camera and the second camera may simultaneously photograph images of the real scene. However, a field of view of the first camera is different from that of the second camera, and the spectrum image acquired by the first camera is slightly different from the color image acquired by the second camera. For example, a field of view (field of view, FoV) of the first camera is smaller than an FoV of the second camera, and a range of the first scene within the field of view of the first camera is smaller than a range of the second scene within the field of view of the second camera. Therefore, a size of the spectrum image acquired by the first camera is less than a size of the color image acquired by the second camera. It should be noted that the spectrum image and the color image include at least a part of a same image, that is, both the color image and the spectrum image include a same target object, to correct the color cast of the reconstructed spectrum image of the color image based on the spectrum image.

S603: Correct the color cast of the reconstructed spectrum image of the color image based on the spectrum image, to acquire a plurality of corrected reconstructed spectrum images.

Specifically, image overlapping regions in the spectrum image and the reconstructed spectrum image, and pixels presenting a same image feature as the spectrum image in the spectrum image and the reconstructed spectrum image are first determined. The pixel presenting the same image feature as the spectrum image in the reconstructed spectrum image may be referred to as a matched pixel. The matched pixel is a pixel that has a same image feature as the spectrum image and that is in an image overlapping region between the reconstructed spectrum image and the spectrum image. It should be understood that both the spectrum image and the reconstructed spectrum image include the pixels presenting the same image feature as the spectrum image, and locations of the pixels presenting the same image feature as the spectrum image in the spectrum image and the reconstructed spectrum image may be the same or different. This is not limited. The matched pixels in the spectrum image and the reconstructed spectrum image may have different pixel values. Compared with the pixel value of the matched pixel in the reconstructed spectrum image, the pixel value of the pixel presenting the same image feature as the spectrum image in the spectrum image is closer to a color of the target object in the real scene, and there is a color cast between the pixel value of the matched pixel in the reconstructed spectrum image and the color of the target object in the real scene.

An image feature mainly includes a color feature, a texture feature, a shape feature, a spatial relationship feature, and the like of an image. The same image feature as the spectrum image in the spectrum image and the reconstructed spectrum image may be determined according to algorithms such as scale-invariant feature transform (SIFT). The scale-invariant feature transform can be used to detect a key point in an image, and is a local feature description algorithm. The same image feature as the spectrum image includes at least one of the color feature, the texture feature, the shape feature, or the spatial relationship feature of the image.

Then, a correction coefficient of each matched pixel in the reconstructed spectrum image is set, and the pixel value of the matched pixel in the reconstructed spectrum image is corrected based on a pixel value of the spectrum image and the correction coefficient, to acquire the corrected reconstructed spectrum image. It may be understood that a pixel value of the corrected reconstructed spectrum image is different from a pixel value of the reconstructed spectrum image. Pixel values of pixels presenting a same image feature as the spectrum image in the corrected reconstructed spectrum image are closer to the color of the target object in the real scene. For the pixels presenting the same image feature as the spectrum image in the spectrum image and the reconstructed spectrum image, if the pixel value of the pixel in the reconstructed spectrum image is greater than the pixel value of the pixel in the spectrum image, the pixel value of the pixel in the reconstructed spectrum image may be reduced. If the pixel value of the pixel in the reconstructed spectrum image is smaller than the pixel value of the pixel in the spectrum image, the pixel value of the pixel in the reconstructed spectrum image may be increased.

In some embodiments, a pixel in the corrected reconstructed spectrum image satisfies the following formula (1):

$$r'=f(s,r)=r+v\cdot(s-r) \quad (1)$$

f(s, r) represents a correction function. r' represents the pixel in the reconstructed spectrum image, s represents a pixel of the spectrum image, and r represents a pixel of the reconstructed spectrum image. v represents the correction coefficient. The correction coefficient may be preconfigured. The correction coefficient ranges from 0 to 1. The higher the pixel matching degree between the spectrum image and the reconstructed spectrum image is, the closer the correction coefficient is to 1. The lower the pixel matching degree between the spectrum image and the reconstructed spectrum image is, the closer the correction coefficient is to 0. For a pixel that is in the reconstructed spectrum image and that does not match a pixel of the spectrum image, the correction coefficient is equal to 0. An unmatched pixel is a pixel that is in the reconstructed spectrum image and that presents a different image feature from the spectrum image.

Figure 7:
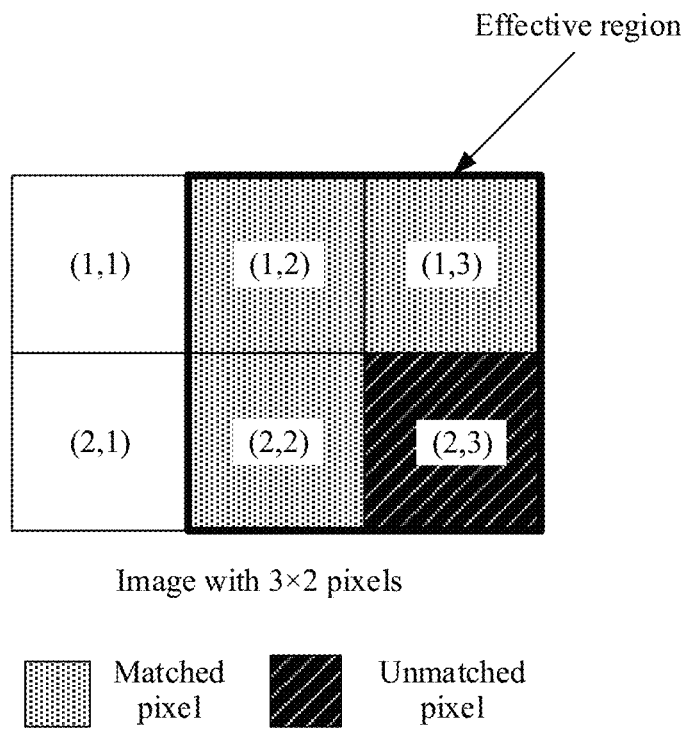
FIG. 7 is a schematic diagram of a corrected reconstructed spectrum image according to an embodiment of this application.

It is assumed that a correction coefficient of a pixel outside an effective region is 0, a correction coefficient of a pixel r that is of the reconstructed spectrum image, that is in the effective region and that matches the pixel s of the spectrum image is 0.8, and a correction coefficient of another pixel is 0.2. For example, as shown in FIG. 7, a color correction process is described by using an image size of 3×2 pixels and a photosensitive band $\lambda_1$ as an example. In this specification, "×" represents multiplication. It is assumed that the effective region is 2×2 pixels in a second column to a third column, that is, the effective region includes pixels whose coordinates are (1, 2), (1, 3), (2, 2), and (2, 3). The pixels (1, 2), (1, 3), and (2, 2) are pixels that match the spectrum image and have a same image feature as the spectrum image, and the pixel (2, 3) is an unmatched pixel. $s(\lambda_1)$ represents a pixel value of the spectrum image, and $$s(\lambda_1) = \begin{bmatrix} p_{11} & p_{12} & p_{13} \\ p_{21} & p_{22} & p_{23} \end{bmatrix} = \begin{bmatrix} 100 & 20 & 23 \\ 80 & 35 & 32 \end{bmatrix}.$$

$r(\lambda_1)$ represents a pixel value of the reconstructed spectrum image, and $$r(\lambda_1) = \begin{bmatrix} 96 & 10 & 3 \\ 30 & 5 & 2 \end{bmatrix}.$$

v represents a value of the correction coefficient, and $$v = \begin{bmatrix} 0 & 0.8 & 0.8 \\ 0 & 0.8 & 0.2 \end{bmatrix}.$$

$r'(\lambda_1)$ represents a pixel value of the corrected reconstructed spectrum image, and $$r'(\lambda_1) = f(s(\lambda_1), r(\lambda_1)) = \begin{bmatrix} 100 & 18 & 19 \\ 80 & 29 & 8 \end{bmatrix}.$$

S604: Fuse the plurality of corrected reconstructed spectrum images to generate a corrected color image.

It may be understood that the corrected reconstructed spectrum image is acquired by correcting a plurality of reconstructed spectrum images with different exposure amounts of the color image, and the corrected color image generated by fusing the corrected reconstructed spectrum images is a high dynamic range image on which color correction has been performed. A color of the corrected color image is closer to a color of the second scene than a color of the color image.

In a possible design, a fusion operation is performed in a spectral domain. To be specific, the corrected reconstructed spectrum images are first fused to acquire a fused spectrum image, and the corrected color image is generated based on the fused spectrum image.

Figure 8:
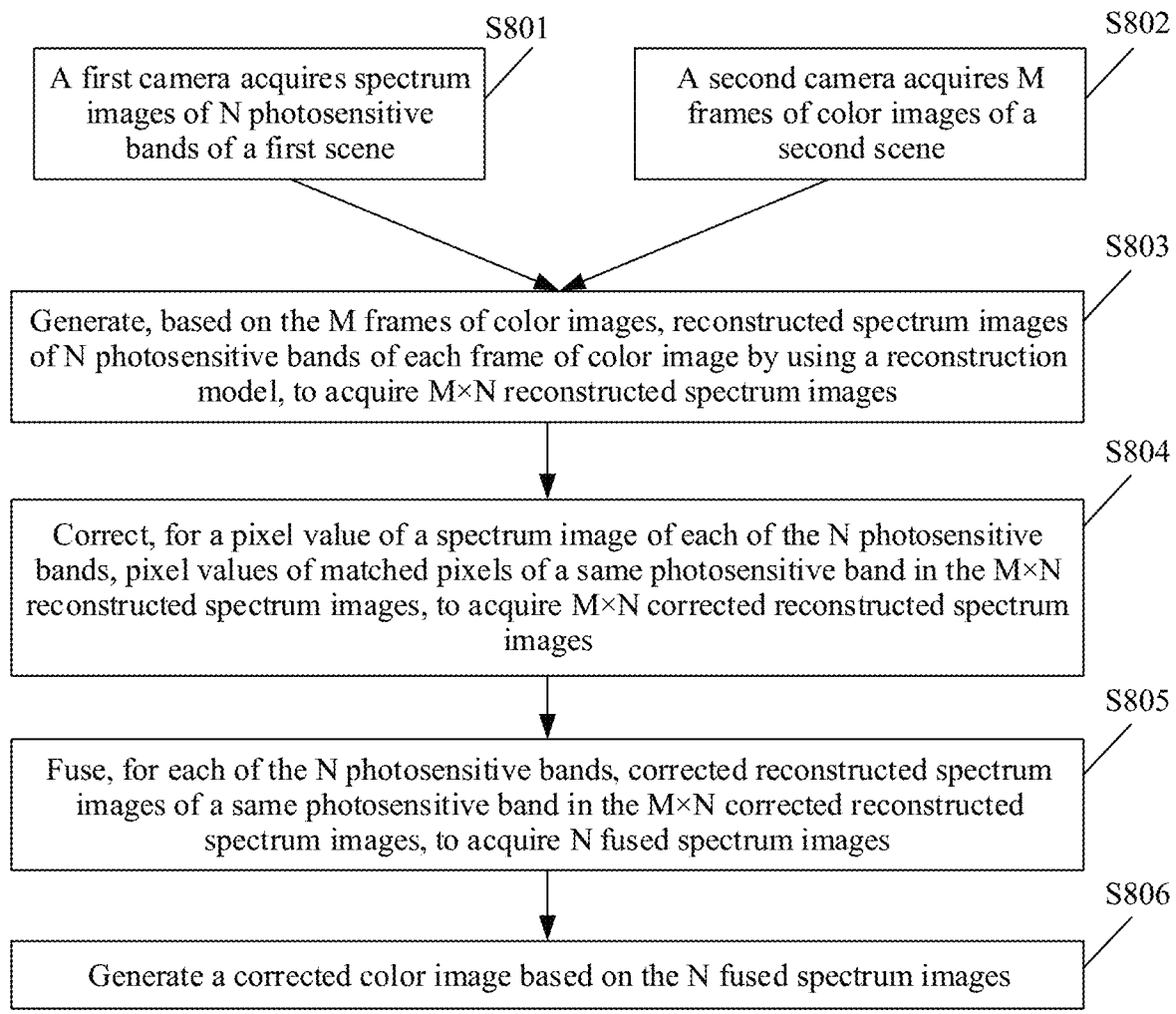
FIG. 8 is a flowchart of another image generation method according to an embodiment of this application.

FIG. 8 is a flowchart of another image generation method according to an embodiment of this application.

S801: A first camera acquires spectrum images of N photosensitive bands of a first scene.

S802: A second camera acquires M frames of color images of a second scene.

A quantity of spectrum images generated by the first camera is determined based on a quantity of photosensitive bands supported by the first camera, and the quantity of photosensitive bands supported by the first camera is determined based on a plurality of optical splitting elements included in the first camera. In this embodiment, the quantity of photosensitive bands supported by the first camera is greater than a quantity of photosensitive bands supported by the second camera. If the second camera supports three photosensitive bands, N is an integer greater than 3.

The second camera can acquire color images with different exposure amounts based on different exposure duration. For example, the second camera may first photograph a color image with a first exposure amount based on first exposure duration, and then photograph a color image with a second exposure amount based on second exposure duration. Herein, the M frames of color images are images with different exposure amounts. M is an integer greater than or equal to 2, to be specific, it indicates that the second camera may acquire at least two frames of color images with different exposure amounts. It is assumed that M=3, the second camera may acquire three frames of color images.

Figure 9:
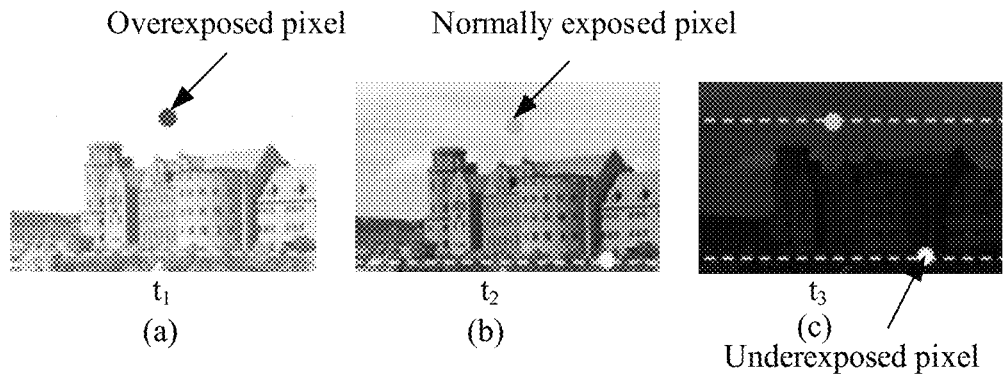
FIG. 9 is a schematic diagram of images with different exposure amounts according to an embodiment of this application.

Due to different exposure duration, effective pixels of all frames of color images are different. For example, in short-time exposure, some pixels are dark and cannot provide effective texture information, that is, underexposure occurs. In long-time exposure, some pixels may be bright and cannot provide effective texture information, that is, overexposure occurs. FIG. 9 is a schematic diagram of images with different exposure amounts according to an embodiment of this application. (a) in FIG. 9 is an image whose exposure duration is $t_1$, (b) in FIG. 9 is an image whose exposure duration is $t_2$, and (c) in FIG. 9 is an image whose exposure duration is $t_3$. Because $t_1>t_2>t_3$, the image whose exposure duration is $t_1$ is brightest, the image whose exposure duration is $t_3$ is darkest, and luminance of the image whose exposure duration is $t_2$ is between luminance of the image whose exposure duration is $t_1$ and luminance of the image whose exposure duration is $t_3$. The image whose exposure duration is $t_1$ includes an overexposed pixel. The image whose exposure duration is $t_2$ includes a normally exposed pixel. The image whose exposure duration is $t_3$ includes an underexposed pixel.

For other related explanations of the first scene, the second scene, the spectrum image, and the color image, refer to the description of S601.

S803: Generate, based on the M frames of color images, reconstructed spectrum images of N photosensitive bands of each frame of color image by using a reconstruction model, to acquire M×N reconstructed spectrum images.

A parameter of the reconstruction model is acquired by training a sample color image and a sample spectrum image that are included in a dataset. The sample color image and the sample spectrum image are photographed for a same scene at a same moment or within a same time interval. To be specific, the sample color image and the sample spectrum image may be images photographed at a same moment after the first camera and the second camera simultaneously receive a photographing instruction. Alternatively, the first camera first receives a first photographing instruction, and photographs the spectrum image. After a period of time, the second camera receives a second photographing instruction, and photographs the color image. It should be understood that the sample color image and the sample spectrum image may be two images whose fields of view overlap, and that the fields of view overlap may also mean that the sample color image and the sample spectrum image overlap. Therefore, the reconstruction model is trained by using the sample color image and the sample spectrum image whose fields of view overlap, to improve accuracy of training the reconstruction model.

Specifically, the sample color image and the sample spectrum image are respectively divided into image blocks based on a fixed size (for example, 16×16 pixels), all image blocks acquired through division are input into the reconstruction model, to acquire several image blocks, and the several image blocks are combined into a predicted reconstructed spectrum image. If the image blocks input to the reconstruction model are acquired by dividing a plurality of pairs of sample color images and sample spectrum images, the image blocks output from the reconstruction model may form a plurality of predicted reconstructed spectrum images. The predicted reconstructed spectrum image is compared with the sample spectrum image, and a difference between the predicted reconstructed spectrum image and the sample spectrum image is measured based on a loss function. The loss function satisfies the following formula (2):

$$\min \frac{1}{N} \sum_{j=1}^{N} \|s(\lambda) - r(\lambda)\|^2 \quad (2)$$

The formula (2) represents calculating a minimum Euclidean distance between the predicted reconstructed spectrum image and the original spectrum image. N represents a quantity of photosensitive bands.

The loss function is calculated based on the sample spectrum image and the predicted reconstructed spectrum image. After a plurality of iterations, when the loss function converges and a value of the loss function is less than or equal to a threshold, the parameter of the reconstruction model is acquired. When the loss function converges and a value of the loss function value is greater than a threshold, the parameter of the reconstruction model is adjusted, and the reconstruction model continues to be trained by using the foregoing method.

After the parameter of the reconstruction model is acquired through training, the M frames of color images may be input into the reconstruction model, to generate the reconstructed spectrum images of the N photosensitive bands of each frame of color image, and finally M×N reconstructed spectrum images are acquired.

S804: Correct, for a pixel value of a spectrum image of each of the N photosensitive bands, pixel values of matched pixels of a same photosensitive band in the M×N reconstructed spectrum images, to acquire M×N corrected reconstructed spectrum images.

Specifically, the M×N reconstructed spectrum images are divided into N reconstructed spectrum image sets based on the N photosensitive bands, and each reconstructed spectrum image set includes M reconstructed spectrum images of a same photosensitive band. The M reconstructed spectrum images of the same photosensitive band are generated from M color images with different exposure amounts. Reconstructed spectrum images included in different reconstructed spectrum image sets have different photosensitive bands. Further, each of M reconstructed spectrum images of a photosensitive band $\lambda_n$ is corrected based on a pixel value of a spectrum image of the photosensitive band $\lambda_n$, that is, a pixel value of a matched pixel in each reconstructed spectrum image is corrected, where n=[1, N]. Each of the M×N reconstructed spectrum images is corrected, to acquire the M×N corrected reconstructed spectrum images. For a specific method for correcting a pixel value of a matched pixel, refer to the description of S603.

In some other embodiments, an effective region of the reconstructed spectrum image is selected. When each of the M reconstructed spectrum images of the photosensitive band $\lambda_n$ is corrected based on the pixel value of the spectrum image of the photosensitive band $\lambda_n$, a pixel value of a matched pixel in an effective region of each reconstructed spectrum image is corrected, to acquire the M×N corrected reconstructed spectrum images. Therefore, a meaningless pixel value in the reconstructed spectrum image is removed, and a pixel value of a pixel that matches the spectrum image and that is in the effective region is corrected. This improves an image processing rate.

The effective region is a region that is in the color image and in which a pixel value falls within a preset range. The region that is in the color image and in which the pixel value falls within the preset range may be determined as the effective region. The preset range of the pixel value may be greater than 5 and less than 250. A region of a pixel whose pixel value is greater than 250 is determined as an overexposure region. A region of a pixel whose pixel value is less than 5 may be determined as an underexpose region. The preset range of the pixel value is not limited in this embodiment, and the preset range of the pixel value may be adjusted based on a photographing requirement. The active region includes a region other than the overexposure region and the underexposure region. A region that is in the reconstructed spectrum image and that overlaps with the effective region of the color image may be determined as the effective region of the reconstructed spectrum image. A range of the effective region of the reconstructed spectrum image is the same as a range of the effective region of the color image.

S805: Fuse, for each of the N photosensitive bands, corrected reconstructed spectrum images of a same photosensitive band in the M×N corrected reconstructed spectrum images, to acquire N fused spectrum images.

Specifically, the M×N corrected reconstructed spectrum images are divided into N corrected reconstructed spectrum image sets based on the N photosensitive bands, and each corrected reconstructed spectrum image set includes M corrected reconstructed spectrum images of a same photosensitive band. Further, for each corrected reconstructed spectrum image set, the M corrected reconstructed spectrum images of the same photosensitive band are fused to acquire the N fused spectrum images.

In some embodiments, weights may be preset for M pieces of different exposure duration, and the corrected reconstructed spectrum images of the same photosensitive band in the M×N corrected reconstructed spectrum images are fused according to a multi-exposure fusion algorithm, to acquire the N fused spectrum images. The fused spectrum image satisfies the following formula (3):

$$r^*(\lambda_n) = \Sigma \omega_m(\lambda_n) \cdot r'_m(\lambda_n), \quad m \in [1, M], \quad n \in [1, N] \qquad (3)$$

$\omega_m(\lambda_n)$ represents the weight of the exposure duration, and $\omega_m(\lambda_n)$ ranges from 0 to 1. $r^*(\lambda_n)$ represents the fused spectrum image. $r'_m(\lambda_n)$ represents the corrected reconstructed spectrum images of the same photosensitive band.

S806: Generate a corrected color image based on the N fused spectrum images.

High dynamic range spectrum images in the N photosensitive bands are converted into a high dynamic range color image through mapping from a spectral domain to RGB space.

First, XYZ tristimulus values of an object surface color are calculated. The tristimulus values satisfy the following formula (4):

$$\begin{cases} X = K \int_\lambda r(\lambda) \bar{x}(\lambda) d\lambda \\ Y = K \int_\lambda r(\lambda) \bar{y}(\lambda) d\lambda \\ Z = K \int_\lambda r(\lambda) \bar{z}(\lambda) d\lambda \end{cases} \qquad (4)$$

K is an adjustment factor, and $\bar{x}(\lambda)$, $\bar{y}(\lambda)$, and $\bar{z}(\lambda)$ are shown in the following Table 2.

TABLE 2

| Wavelength ($\lambda$) | 2-degree field of view in the CIE 1931 standard | | |
|---|---|---|---|
| | $\bar{x}(\lambda)$ | $\bar{y}(\lambda)$ | $\bar{z}(\lambda)$ |
| 380 | 0.0014 | 0 | 0.0065 |
| 390 | 0.0042 | 0.0001 | 0.0201 |
| 400 | 0.0143 | 0.0004 | 0.0679 |
| 410 | 0.0435 | 0.0012 | 0.2074 |
| 420 | 0.1344 | 0.004 | 0.6456 |
| 430 | 0.2839 | 0.0116 | 1.3856 |
| 440 | 0.3483 | 0.023 | 1.7471 |
| 450 | 0.3362 | 0.038 | 1.7721 |
| 460 | 0.2908 | 0.06 | 1.6692 |
| 470 | 0.1954 | 0.091 | 1.2876 |
| 480 | 0.0956 | 0.139 | 0.8132 |
| 490 | 0.032 | 0.208 | 0.4652 |
| 500 | 0.0049 | 0.323 | 0.272 |
| 510 | 0.0093 | 0.503 | 0.1582 |
| 520 | 0.0633 | 0.71 | 0.0782 |
| 530 | 0.1655 | 0.862 | 0.0422 |
| 540 | 0.2904 | 0.954 | 0.0203 |
| 550 | 0.4334 | 0.995 | 0.0087 |
| 560 | 0.5945 | 0.995 | 0.0039 |
| 570 | 0.7621 | 0.952 | 0.0021 |
| 580 | 0.9163 | 0.87 | 0.0017 |

TABLE 2-continued

| Wavelength ($\lambda$) | 2-degree field of view in the CIE 1931 standard | | |
|---|---|---|---|
| | $\bar{x}(\lambda)$ | $\bar{y}(\lambda)$ | $\bar{z}(\lambda)$ |
| 590 | 1.0263 | 0.757 | 0.0011 |
| 600 | 1.0622 | 0.631 | 0.0008 |
| 610 | 1.0026 | 0.503 | 0.0003 |
| 620 | 0.8544 | 0.381 | 0.0002 |
| 630 | 0.6424 | 0.265 | 0 |
| 640 | 0.4479 | 0.175 | 0 |
| 650 | 0.2835 | 0.107 | 0 |
| 660 | 0.1649 | 0.061 | 0 |
| 670 | 0.0874 | 0.032 | 0 |
| 680 | 0.0468 | 0.017 | 0 |
| 690 | 0.0227 | 0.0082 | 0 |
| 700 | 0.0114 | 0.0041 | 0 |
| 710 | 0.0058 | 0.0021 | 0 |
| 720 | 0.0029 | 0.001 | 0 |
| 730 | 0.0014 | 0.005 | 0 |
| 740 | 0.0007 | 0.0003 | 0 |
| 750 | 0.0003 | 0.001 | 0 |
| 760 | 0.0002 | 0.001 | 0 |
| 770 | 0.0001 | 0 | 0 |
| 780 | 0 | 0 | 0 |

Then, RGB tricolor values are calculated. L is a conversion matrix from XYZ to RGB in the CIE 1931 standard under a D65 standard illuminant. The corrected color image satisfies the following formula (5):

$$\begin{bmatrix} R \\ G \\ B \end{bmatrix} = L \cdot \begin{bmatrix} X \\ Y \\ Z \end{bmatrix} \qquad (5)$$

$$L = \begin{bmatrix} 3.239886 & -1.536869 & -0.498444 \\ -0.967675 & 1.872930 & 0.041488 \\ 0.056595 & -0.207515 & 1.075305 \end{bmatrix}.$$

In this way, the second camera and the first camera that has more photosensitive bands than the second camera are combined, rich spectral information acquired by the first camera is fully used to assist in correcting a color of the color image in the spectral domain, the corrected reconstructed spectrum images are fused to acquire the fused spectrum image with a high dynamic range, and the corrected high dynamic range color image is generated based on the fused spectrum image with the high dynamic range, so that a color of the corrected high dynamic range color image is more refined and accurate, and is closer to a color of a real scene.

Figure 10:
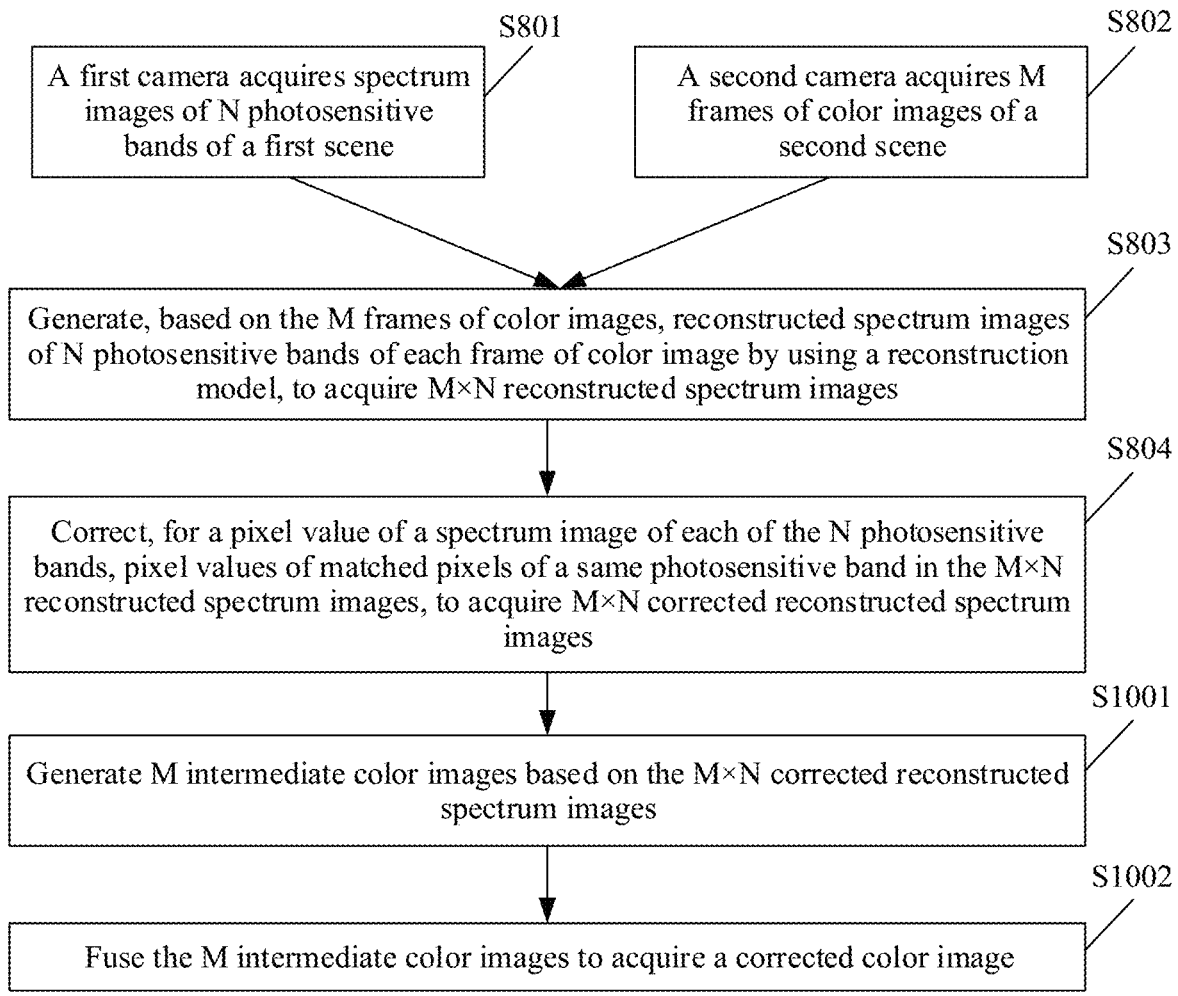
FIG. 10 is a flowchart of still another image generation method according to an embodiment of this application.

In another possible design, a fusion operation is performed in a color gamut. To be specific, an intermediate color image is first generated based on the corrected reconstructed spectrum image, and intermediate color images are fused to generate a corrected color image. As shown in FIG. 10, a difference from FIG. 8 is that S1001 and S1002 are performed after S804.

S1001: Generate M intermediate color images based on the M×N corrected reconstructed spectrum images.

Specifically, the M×N corrected reconstructed spectrum images are divided into M corrected reconstructed spectrum image sets based on M pieces of exposure duration, and each corrected reconstructed spectrum image set includes N corrected reconstructed spectrum images of different photosensitive bands within one piece of exposure duration. Each corrected reconstructed spectrum image set corresponds to different exposure duration. Further, for a corrected reconstructed spectrum image set with each exposure duration, one intermediate color image is generated based on the N corrected reconstructed spectrum images of the different photosensitive bands, to acquire the M intermediate color images. For a specific method for generating the M intermediate color images, refer to the descriptions of formula (4) and formula (5) in S806.

S1002: Fuse the M intermediate color images to acquire the corrected color image.

In some embodiments, weights may be preset for M pieces of different exposure duration, and the M intermediate color images are fused according to a multi-exposure fusion algorithm, to acquire the corrected color image. The corrected color image satisfies the following formula (6):

$$p^* = \Sigma \omega_m(t_m) \cdot p^*_m(t_m), \ m \in [1, M] \quad (6)$$

$\omega_m(t_m)$ represents the weight of the exposure duration, and $\omega_m(t_m)$ ranges from 0 to 1. $p^*_m(t_m)$ represents the intermediate color image. $p^*$ represents the corrected color image.

In some embodiments, a standard color card is used to evaluate a color of the corrected color image. Specifically, the standard color card is placed in a photographing scene, and the first camera and the second camera photograph the standard color card, to acquire the spectrum image and the color image. The spectrum image and the color image each include a pixel value of the standard color card. According to the method provided in this embodiment, the color image is corrected based on the spectrum image, to acquire the corrected reconstructed spectrum image. Because a cielab value of each color block of the standard color card is known, the corrected reconstructed spectrum image includes the cielab value of the color block of the standard color card, a color difference $\Delta E$ between a cielab value of a color block of the corrected reconstructed spectrum image and the cielab value of the color block of the standard color card is calculated according to the CIEDE2000 standard. If $\Delta E$ is less than 2, color correction performance is good.

In this way, the second camera and the first camera that has more photosensitive bands than the second camera are combined, rich spectral information acquired by the first camera is fully used to assist in correcting a color of the color image in a spectral domain, the intermediate color image is generated based on the corrected reconstructed spectrum image, and the intermediate color images are fused to generate the corrected high dynamic range color image, so that the color of the corrected high dynamic range color image is more refined and accurate, and is closer to a color of a real scene.

The following uses an example to describe an image generation process provided in this embodiment of this application. It is assumed that the first camera 1101 supports five photosensitive bands, and the second camera 1103 supports three pieces of exposure duration, that is, N=5 and M=3.

Figure 11A:
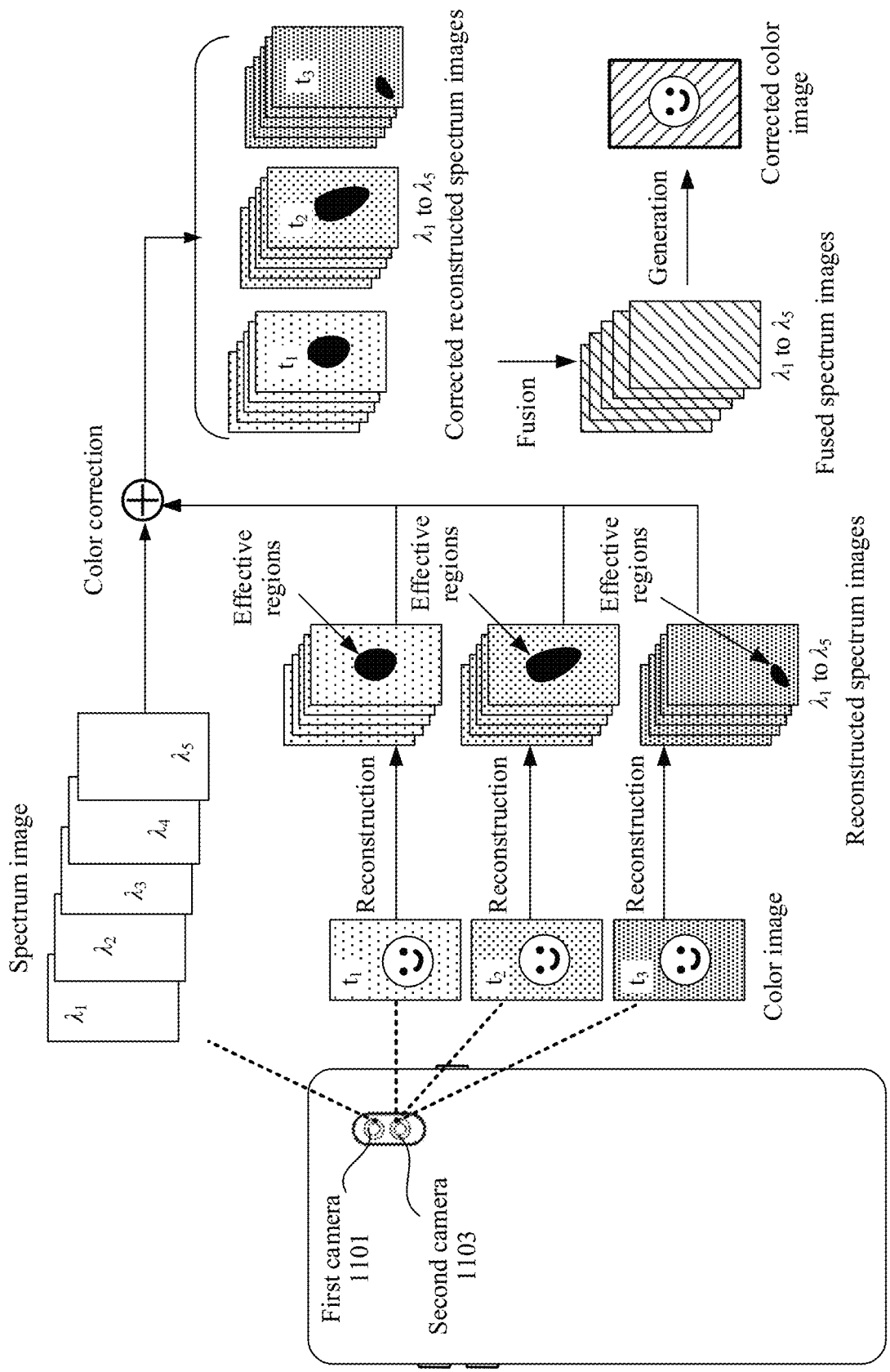
FIG. 11($a$) and FIG. 11($b$) each are a schematic diagram of an image generation process according to an embodiment of this application.
Figure 11B:
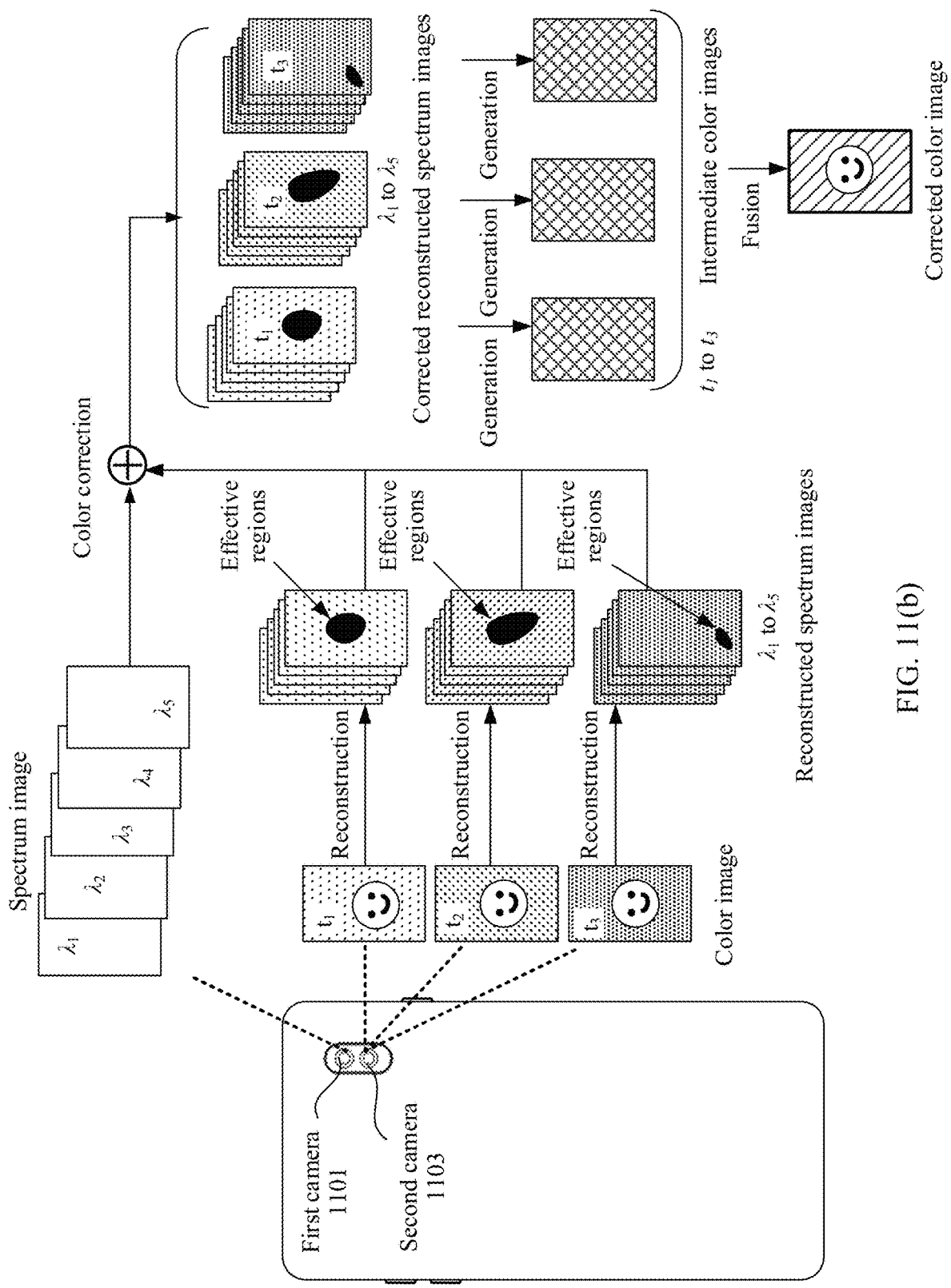

As shown in FIG. 11(*a*), the first camera acquires spectrum images $s(\lambda)$ of five photosensitive bands: a spectrum image $s(\lambda_1)$, a spectrum image $s(\lambda_2)$, a spectrum image $s(\lambda_3)$, a spectrum image $s(\lambda_4)$, and a spectrum image $s(\lambda_5)$.

The second camera acquires three frames of color images $p(t)$ with different exposure amounts: a color image $p(t_1)$, a color image $p(t_2)$, and a color image $p(t_3)$, based on the exposure duration $t_1$, $t_2$, and $t_3$. For example, $t_1$ is 1/10 seconds, $t_2$ is 1/30 seconds, and $t_3$ is 1/100 seconds.

The reconstruction model is used to generate reconstructed spectrum images $r(\lambda)$ of five photosensitive bands of each frame of color image based on the three frames of color images, to acquire 3×5 reconstructed spectrum images. For example, within the exposure duration $t_1$, a reconstructed spectrum image $r_{t_1}(\lambda_1), r_{t_1}(\lambda_2), r_{t_1}(\lambda_3), r_{t_1}(\lambda_4), r_{t_1}(\lambda_5)$ is acquired through reconstruction based on the color image $p(t_1)$; within the exposure duration $t_2$, a reconstructed spectrum image $r_{t_2}(\lambda_1), r_{t_2}(\lambda_2), r_{t_2}(\lambda_3), r_{t_2}(\lambda_4), r_{t_2}(\lambda_5)$ is generated based on the color image $p(t_2)$; and within the exposure duration $t_3$, a reconstructed spectrum image $r_{t_3}(\lambda_1), r_{t_3}(\lambda_2), r_{t_3}(\lambda_3), r_{t_3}(\lambda_4), r_{t_3}(\lambda_5)$ is generated based on the color image $p(t_3)$.

For a pixel value of a spectrum image of each of the five photosensitive bands, pixel values of matched pixels of a same photosensitive band in the 3×5 reconstructed spectrum images are corrected, to acquire 3×5 corrected reconstructed spectrum images. For example, color correction is performed on the reconstructed spectrum images $r_{t_1}(\lambda_1), r_{t_2}(\lambda_1), r_{t_3}(\lambda_1)$ based on the spectrum image $s(\lambda_1)$ of the photosensitive band $\lambda_1$, to acquire corrected reconstructed spectrum images $r'_{t_1}(\lambda_1), r'_{t_2}(\lambda_1), r'_{t_3}(\lambda_1)$. By analogy, other reconstructed spectrum images are corrected to acquire corrected reconstructed spectrum images $r'_{t_1}(\lambda_2), r'_{t_2}(\lambda_2), r'_{t_3}(\lambda_2)$, corrected reconstructed spectrum images $r'_{t_1}(\lambda_3), r'_{t_2}(\lambda_3), r'_{t_3}(\lambda_3)$, corrected reconstructed spectrum images $r'_{t_1}(\lambda_4), r'_{t_2}(\lambda_4), r'_{t_3}(\lambda_4)$, and corrected reconstructed spectrum images $r'_{t_1}(\lambda_5), r'_{t_2}(\lambda_5), r'_{t_3}(\lambda_5)$.

Specifically, for the pixel value of the spectrum image of each of the five photosensitive bands, pixel values of matched pixels of a same photosensitive band in effective regions of the 3×5 reconstructed spectrum images are corrected, to acquire the 3×5 corrected reconstructed spectrum images.

For each of the five photosensitive bands, corrected reconstructed spectrum images of a same photosensitive band in the 3×5 corrected reconstructed spectrum images are fused to acquire five fused spectrum images. For example, corrected reconstructed spectrum images $r_{t_1}(\lambda_1), r_{t_2}(\lambda_1), r_{t_3}(\lambda_1)$ of all photosensitive bands $\lambda_1$ within the exposure duration $t_1$, $t_2$, and $t_3$ are fused to acquire a fused spectrum image $r^*(\lambda_1)$ of the photosensitive band $\lambda_1$. By analogy, corrected reconstructed spectrum images of the photosensitive band $\lambda_2$ the photosensitive band $\lambda_3$, the photosensitive band $\lambda_4$, and the photosensitive band $\lambda_5$ are respectively fused to acquire fused spectrum images $r^*(\lambda_2), r^*(\lambda_3), r^*(\lambda_4), r^*(\lambda_5)$.

The corrected color image $p^*$ is generated based on the five fused spectrum images, and the color of the corrected color image is closer to a color of the second scene than a color of the color image.

As shown in FIG. 11(*b*), after the 3×5 corrected reconstructed spectrum images are acquired, for each of three pieces of exposure duration, three intermediate color images are generated based on the 3×5 corrected reconstructed spectrum images. For example, an intermediate color image $p^*(t_1)$ within the exposure duration $t_1$ is generated based on corrected reconstructed spectrum images $r_{t_1}(\lambda_1), r_{t_1}(\lambda_2), r_{t_1}(\lambda_3), r_{t_1}(\lambda_4), r_{t_1}(\lambda_5)$ of all photosensitive bands $\lambda_1$ to the photosensitive bands $\lambda_5$ within the exposure duration $t_1$. By analogy, intermediate color images $p^*(t_2), p^*(t_3)$ are respectively generated based on corrected reconstructed spectrum images of all photosensitive bands $\lambda_1$ to the photosensitive bands $\lambda_5$ with the exposure duration $t_2$ and the exposure duration $t_3$. The three intermediate color images are fused to acquire the corrected color image $p^*$.

Generally, a monochrome camera does not have a color filter, and has a stronger photosensitive capability than an RGB camera. This can acquire richer brightness information, and improve imaging details. The RGB camera can provide rich color information. However, because three RGB pixels are arranged in space, some spatial resolution is sacrificed. As a result, effective resolution of the RGB camera is usually lower than that of the monochrome camera. Based on the foregoing background, brightness information of a black-and-white image and color information of a color image may be fused to acquire a color image that retains image color information but has more details. However, the black-and-white image cannot provide color information. Therefore, compared with the image generation method provided in this application, the conventional technology has a limited color cast correction capability.

In the conventional technology, there is still a technology of fusing two or more color images. Specifically, there are two implementations. One is that two RGB cameras separately photograph a same scene to acquire two color images, and there is a deviation between fields of view of the two images, so that specific depth information can be estimated. This can achieve effect such as background blurring, foreground enhancement, and motion blur removal. The other is that a same RGB camera photographs a same scene for a plurality of times under different exposure conditions, to acquire a plurality of frames of color images with different dynamic ranges, and the plurality of frames of images are fused according to the multi-exposure fusion algorithm, to acquire a high dynamic range color image.

For the first method, because the two cameras are both RGB cameras, and the two cameras can sense only three red, green, and blue bands of a spectrum. Although there are two cameras, spectral information of an additional photosensitive band cannot be provided. As a result, color information other than red, green, and blue cannot be acquired, and color improvement or color cast correction of an image is not improved. An extreme case is that, in a large-area monochrome scene or a scene in which a plurality of light sources are used for irradiation, the color images photographed by the two cameras each have a color cast, even if the two color images are fused, the color cast still exists.

For the second method, a defect of the second method is as described above, and the plurality of frames of color images photographed under different exposure conditions may have a color cast. Although respective weights are adjusted in a fusion process, color cast correction is not involved in this process, and the color cast may still exist after fusion. In the image generation method provided in this application, a multi spectral sensor is introduced for the defect. Color cast correction is performed on reconstructed spectrum images of the plurality of frames of color images, and then multi-exposure image fusion is performed in the spectral domain, to resolve a color cast problem of the image.

When performing the image generation method for a software system provided in this embodiment, an image generation module uses an artificial intelligence (AI) model. There are a plurality of types of AI models, and a neural network model is one of the AI models. The neural network model is a type of mathematical calculation model that imitates a structure and a function of a biological neural network (a central nervous system of an animal). A neural network model may include a plurality of neural network layers with different functions, where each layer includes a parameter and a calculation formula. Based on different calculation formulas or different functions, different layers in the neural network model have different names. For example, a layer for convolution calculation is referred to as a convolutional layer, and the convolutional layer is usually used to perform feature extraction on an input signal (for example, an image). A neural network model may alternatively include a combination of a plurality of existing neural network models. Neural network models of different structures may be used in different scenarios (for example, classification and recognition). Alternatively, neural network models of different structures provide different effect when used in a same scenario. Different structures of the neural network models specifically include one or more of the following: quantities of network layers in the neural network models are different, sequences of the network layers are different, or weights, parameters, or calculation formulas at the network layers are different. A plurality of different neural network models that have high accuracy and that are used in application scenarios such as recognition or classification already exist in the industry. Some of the neural network models may be trained by using a specific training set, to independently complete a task, or to complete a task in combination with another neural network model (or another functional submodule). Some of the neural network models may alternatively be directly used to independently complete a task, or to complete a task in combination with another neural network model (or another functional submodule). When this embodiment is described, the neural network model may be a deep convolutional neural network. The deep convolutional neural network includes an input layer, a convolutional layer, three activation function layers, and an output layer.

The reconstruction model provided in this embodiment is a deep convolutional neural network, and is configured to generate the reconstructed spectrum images of the N photosensitive bands of each frame of color image based on the M frames of color images, to acquire the M×N reconstructed spectrum images. Before the reconstruction model generates the reconstructed spectrum image based on the color image, a training module trains the reconstruction model. After training the reconstruction model by using a dataset, the training module may deploy the reconstruction model in a correction submodule in the image generation module, and the correction submodule generates the reconstructed spectrum image based on the color image.

Figure 12:
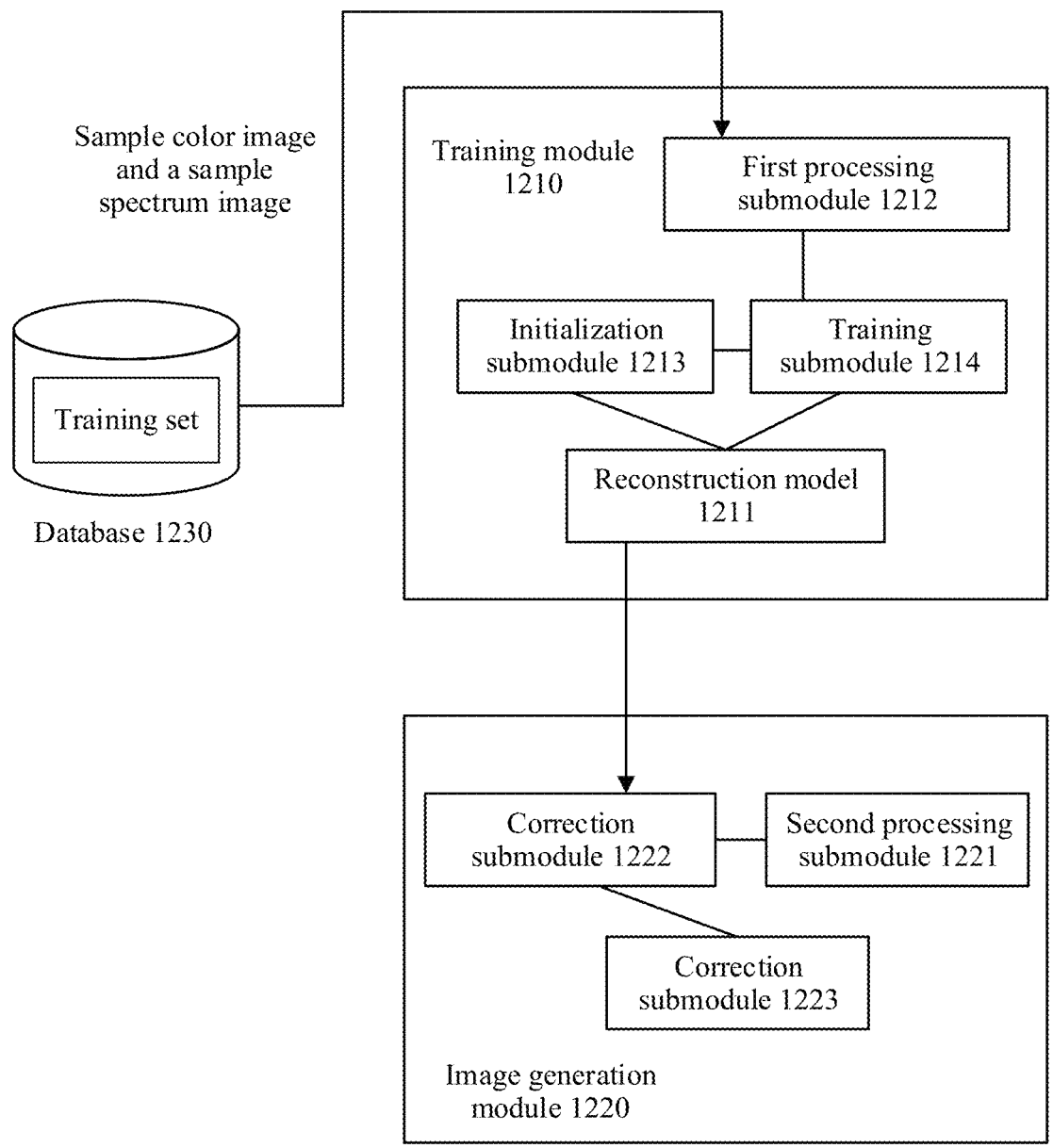
FIG. 12 is a schematic diagram of structures of a training module and an image generation module according to an embodiment of this application.

FIG. 12 is a schematic diagram of structures of a training module 1210 and an image generation module 1220. The following describes structures and functions of the training module 1210 and the image generation module 1220 with reference to FIG. 12. It should be understood that division of the structure and the functional submodules of the training module 1210 and the image generation module 1220 is only an example in embodiments of this application, but specific division is not limited.

Before the training module 1210 trains a reconstruction model 1211, an initialization submodule 1213 first initializes a parameter of each layer in the reconstruction model 1211 (that is, assigns an initial value to each parameter). Then, a training submodule 1214 reads data in a dataset in a database 1230. The dataset includes a sample color image and a sample spectrum image. A first preprocessing submodule 1212 preprocesses the sample color image, to be specific, removes a meaningless pixel value from the color image, and corrects a pixel value of a matched pixel in an effective region, thereby improving an image processing rate of the reconstruction model 1211.

The reconstruction model 1211 is trained by using preprocessed data, until a loss function in the reconstruction model 1211 converges and a value of the loss function is less than a specific threshold. In this case, training of the reconstruction model 1211 is completed. Alternatively, if all data in a defect location training set is used for training, training of the reconstruction model 1211 is completed.

Optionally, the reconstruction model 1211 may alternatively not need to be trained by the training module 1210. For example, the reconstruction model 1211 uses a neural network model that has been trained by a third party and that has good accuracy for generating a reconstructed spectrum image. In this embodiment, the data set may not be constructed. For example, the data set is directly acquired from the third party.

The reconstruction model 1211 trained by the training module 1210 is configured to generate the reconstructed spectrum image based on the color image. In this embodiment, as shown in FIG. 12, the trained reconstruction model 1211 is deployed on a correction submodule 1222 in the image generation module 1220.

As shown in FIG. 12, the image generation module 1220 includes a second preprocessing submodule 1221, a correction submodule 1222, and a generation submodule 1223.

The second preprocessing submodule 1221 is configured to preprocess a color image from a camera to acquire an effective region of the color image. For a specific method for acquiring the effective region, refer to the description of S804.

The correction submodule 1222 is configured to: generate, based on M frames of color images, reconstructed spectrum images of N photosensitive bands of each frame of color image by using the reconstruction model 1211, to acquire M×N reconstructed spectrum images; and correct, for a pixel value of a spectrum image of each of the N photosensitive bands, pixel values of matched pixels of a same photosensitive band in effective regions of the M×N reconstructed spectrum images, to acquire M×N corrected reconstructed spectrum images. For a specific method for correcting the reconstructed spectrum image, refer to the descriptions of S603, S803, and S804.

The generation submodule 1223 is configured to: fuse, for each of the N photosensitive bands, corrected reconstructed spectrum images of a same photosensitive band in the M×N corrected reconstructed spectrum images to acquire N fused spectrum images, and generate a corrected color image based on the N fused spectrum images. A color of the corrected color image is closer to a color of a second scene than a color of the color image. For a specific method for generating the corrected color image, refer to the descriptions of S604, S805, and S806.

The generation submodule 1223 is further configured to: generate M intermediate color images based on the M×N corrected reconstructed spectrum images, and fuse the M intermediate color images to acquire a corrected color image. For a specific method for generating the corrected color image, refer to the descriptions of S604, S1001, and S1002.

With the functions of the foregoing submodules, the color image may be corrected based on the spectrum image. Therefore, rich spectral information is fully used to assist in correcting a color of the color image in a spectral domain, a high dynamic range spectrum image of each photosensitive band is acquired through multi-exposure fusion, and finally a high dynamic range image is acquired through mapping, to implement a high dynamic range image with a more refined and accurate color.

It may be understood that, to implement the functions in the foregoing embodiments, the electronic device includes a corresponding hardware structure and/or a corresponding software module for performing each function. A person of ordinary skill in the art should easily be aware that, in combination with the units and the method steps in the examples described in embodiments disclosed in this application, this application can be implemented by hardware or a combination of hardware and computer software. Whether a function is performed through hardware or hardware driven by computer software depends on particular application scenarios and design constraint conditions of the technical solutions.

Figure 13:
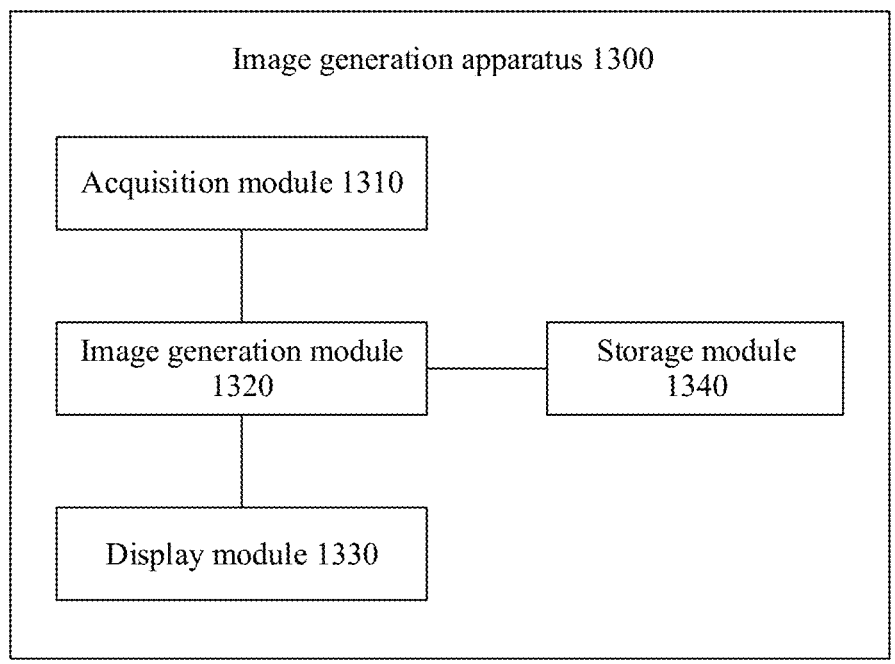
FIG. 13 is a schematic diagram of a structure of an image generation apparatus according to an embodiment of this application.

FIG. 13 is a schematic diagram of a structure of a possible image generation apparatus according to an embodiment of this application. The image generation apparatus may be configured to implement functions of the electronic device in the foregoing method embodiment, and therefore can also implement beneficial effect of the foregoing method embodiments. In this embodiment of this application, the image generation apparatus may be the electronic device shown in FIG. 3, or may be a module (for example, a chip) used in the electronic device.

As shown in FIG. 13, the image generation apparatus 1300 includes an acquisition module 1310, an image generation module 1320, and a display module 1330. The image generation apparatus 1300 is configured to implement functions of the electronic device in the method embodiment shown in FIG. 6, FIG. 8, or FIG. 10.

Figure 6:
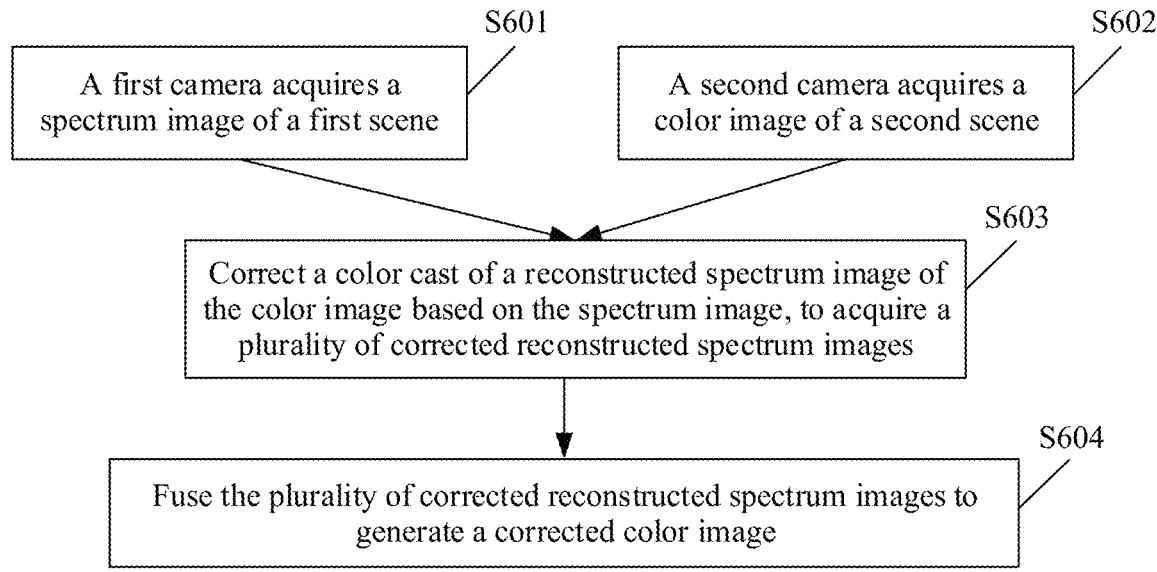
FIG. 6 is a flowchart of an image generation method according to an embodiment of this application.

When the image generation apparatus 1300 is configured to implement the functions of the electronic device in the method embodiment shown in FIG. 6, the acquisition module 1310 is configured to perform S601 and S602, and the image generation module 1320 is configured to perform S603 and S604.

When the image generation apparatus 1300 is configured to implement the functions of the electronic device in the method embodiment shown in FIG. 8, the acquisition module 1310 is configured to perform S801 and S802, and the image generation module 1320 is configured to perform S803 to S806.

When the image generation apparatus 1300 is configured to implement the functions of the electronic device in the method embodiment shown in FIG. 10, the acquisition module 1310 is configured to perform S801 and S802, and the image generation module 1320 is configured to perform S803 and S804, and S1001 and S1002.

The image generation apparatus 1300 may further include a storage module 1340. The storage module 1340 is configured to store program instructions related to the image generation method provided in embodiments of this application, data generated in a process of running the program instructions related to the image generation method, and the like.

The display module 1330 is configured to display a color image photographed by the camera 393 in FIG. 3 and a corrected color image generated by the image generation module 1320. A function of the display module 1330 may be implemented by the display screen 392 in FIG. 3. A function of the acquisition module 1310 may be implemented by the camera 393 in FIG. 3. A function of the image generation module 1320 may be implemented by the processor 310 in FIG. 3. A function of the storage module 1340 may be implemented by the internal memory 321 in FIG. 3. The image generation module 1320 may further specifically include a preprocessing submodule, a correction submodule, and a generation submodule.

For more detailed descriptions of the acquisition module 1310, the image generation module 1320, and the display module 1330, directly refer to related descriptions in the embodiments shown in FIG. 1 to FIG. 12. Details are not described herein again.

Figure 14:
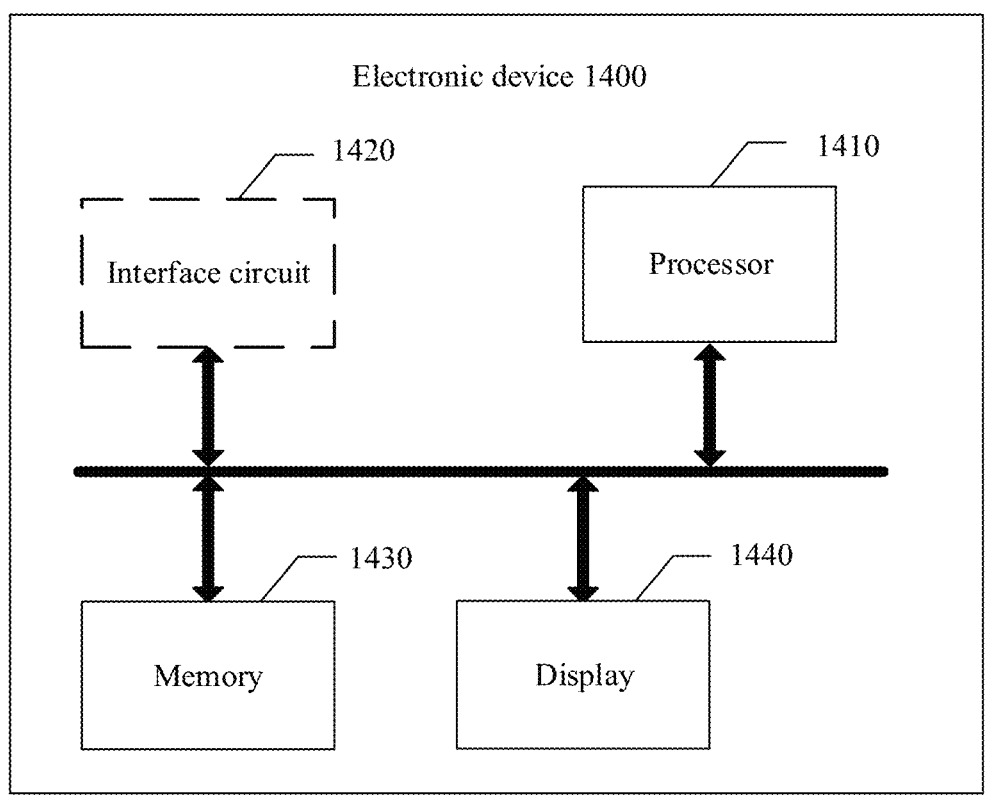
FIG. 14 is a schematic diagram of a structure of an electronic device according to an embodiment of this application.

As shown in FIG. 14, an electronic device 1400 includes a processor 1410, an interface circuit 1420, a memory 1430, and a display 1440. The processor 1410 and the interface circuit 1420 are coupled to each other. It may be understood that the interface circuit 1420 may be an input/output interface. The memory 1430 is configured to store instructions executed by the processor 1410, store input data required by the processor 1410 to run the instructions, or store data generated after the processor 1410 runs the instructions. The display 1440 is configured to display a color image and a corrected color image.

When the electronic device 1400 is configured to implement the method shown in FIG. 6, FIG. 8, or FIG. 10, the processor 1410 is configured to perform a function of the image generation module 1320, the interface circuit 1420 is configured to perform a function of the acquisition module 1310, and the display 1440 is configured to perform a function of the display module 1330.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be alternatively a component of the processor. The processor and the storage medium may be disposed in an ASIC. In addition, the ASIC may be located in a network device or a terminal device. Certainly, the processor and the storage medium may exist in a network device or a terminal device as discrete components.

All or some of the foregoing embodiments may be implemented by software, hardware, firmware, or any combination thereof. When the software is used for implementation, all or some of the embodiments may be implemented in a form of a computer program product. The computer program product includes one or more computer programs and instructions. When the computer programs or instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. In this specification, the claims, and the accompanying drawings of this application, the terms "first", "second", "third", and the like are intended to distinguish between different objects but do not limit a particular order.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In this application, "at least one" means one or more. "A plurality of" means two or more than two. The term "and/or" describes an association relationship between associated objects and indicates that three relationships may exist. For example, A and/or B may indicate the following cases: Only A exists, both A and B exist, and only B exists. A and B may be singular or plural. In the text descriptions of this application, the character "/" usually indicates an "or" relationship between associated objects. In addition, an element that appears in singular forms "a", "an", and "the" does not mean "one or only one" unless otherwise specified in the context, but means "one or more". For example, "a device" means one or more such devices. Furthermore, "at least one of . . . " means one or any combination of subsequent associated objects. For example, "at least one of A, B, and C" includes A, B, C, AB, AC, BC, or ABC.

What is claimed is:

1. An image generation method, comprising:
acquiring one or more spectrum images of a first scene by using a first camera;
acquiring one or more color images of a second scene by using a second camera, wherein the one or more color images and the one or more spectrum images comprise a same target object, and a quantity of photosensitive bands of the first camera is not less than a quantity of photosensitive bands of the second camera;
correcting one or more color casts of one or more reconstructed spectrum images of the one or more color images based on the one or more spectrum images, to acquire a plurality of corrected reconstructed spectrum images, wherein the correcting one or more color casts of one or more reconstructed spectrum images of the one or more color images based on the one or more spectrum images, to acquire a plurality of corrected reconstructed spectrum images comprises:
  correcting a pixel value of a matched pixel in a reconstructed spectrum image of the one or more reconstructed spectrum images based on a pixel value of a spectrum image of the one or more spectrum images, to acquire the plurality of corrected reconstructed spectrum images, wherein the matched pixel is a pixel that has a same image feature as a pixel in the spectrum image and that is in an image overlapping region between the reconstructed spectrum image and the spectrum image; and
  fusing the plurality of corrected reconstructed spectrum images to generate a corrected color image.

2. The method according to claim 1, wherein the one or more spectrum images comprise spectrum images of N photosensitive bands, the one or more color images comprise M frames of color images, each frame of the M frames of color images has a different exposure amount, the one or more reconstructed spectrum images comprise M×N reconstructed spectrum images, the M×N reconstructed spectrum images comprise spectrum images of N photosensitive bands of each of the M frames of color images, and both N and M are integers greater than or equal to 1, and wherein the fusing the plurality of corrected reconstructed spectrum images to generate a corrected color image comprises:
  fusing, for each of the N photosensitive bands, corrected reconstructed spectrum images of a same photosensitive band in M×N corrected reconstructed spectrum images, to acquire N fused spectrum images; and
  generating the corrected color image based on the N fused spectrum images.

3. The method according to claim 1, wherein the one or more spectrum images comprise spectrum images of N photosensitive bands, the one or more color images comprise M frames of color images, each frame of the M frames of color images has a different exposure amount, the one or more reconstructed spectrum images comprise M×N reconstructed spectrum images, the M×N reconstructed spectrum images comprise spectrum images of N photosensitive bands of each of the M frames of color images, and both N and M are integers greater than or equal to 1, and wherein the fusing the plurality of corrected reconstructed spectrum images to generate a corrected color image comprises:
  generating M intermediate color images based on M×N corrected reconstructed spectrum images; and
  fusing the M intermediate color images to acquire the corrected color image.

4. The method according to claim 2, wherein the correcting comprises:
  correcting, for a pixel value of a spectrum image of each of the N photosensitive bands, pixel values of matched pixels of a same photosensitive band in the M×N reconstructed spectrum images, to acquire M×N corrected reconstructed spectrum images, wherein the plurality of corrected reconstructed spectrum images comprise the M×N corrected reconstructed spectrum images.

5. The method according to claim 4, wherein the correcting, for a pixel value of a spectrum image of each of the N photosensitive bands, pixel values of matched pixels of a same photosensitive band in the M×N reconstructed spectrum images comprises:
  correcting, for the pixel value of the spectrum image of each of the N photosensitive bands, pixel values of matched pixels of a same photosensitive band in effective regions of the M×N reconstructed spectrum images, wherein the effective region is a region that is in a color image and whose pixel value falls within a preset range, and a range of the effective region of the reconstructed spectrum image is the same as a range of an effective region of the color image.

6. The method according to claim 4, wherein the method further comprises:
  generating, based on the M frames of color images, reconstructed spectrum images of N photosensitive bands of each frame of the M frames of color images by using a reconstruction model, to acquire the M×N reconstructed spectrum images.

7. The method according to claim 6, wherein a parameter of the reconstruction model is determined by training the reconstruction model based on a sample color image and a sample spectrum image and calculating a loss function based on the sample spectrum image and a predicted reconstructed spectrum image output by the reconstruction model, and is determined when the loss function converges and a value of the loss function is less than or equal to a threshold.

8. The method according to claim 1, wherein both the first camera and the second camera are rear-facing cameras, or both the first camera and the second camera are front-facing cameras.

9. The method according to claim 1, wherein the corrected color image is a high dynamic range image relative to a color image of the one or more color images.

10. An image generation apparatus, comprising:
  one or more processors; and
  a memory, wherein the memory stores a computer program, and when executing the computer program stored in the memory, the one or more processors executes operations comprising:
  acquiring one or more spectrum images of a first scene by using a first camera;
  acquiring one or more color images of a second scene by using a second camera, wherein the one or more color images and the one or more spectrum images comprise a same target object, and a quantity of photosensitive bands of the first camera is not less than a quantity of photosensitive bands of the second camera;
  correcting one or more color casts of one or more reconstructed spectrum images of the one or more color images based on the one or more spectrum images, to acquire a plurality of corrected reconstructed spectrum images, wherein the correcting one or more color casts of one or more reconstructed spectrum images of the one or more color images based on the one or more spectrum images, to acquire a plurality of corrected reconstructed spectrum images comprises:
    correcting a pixel value of a matched pixel in a reconstructed spectrum image of the one or more reconstructed spectrum images based on a pixel value of a spectrum image of the one or more spectrum images, to acquire the plurality of corrected reconstructed spectrum images, wherein the matched pixel is a pixel that has a same image feature as a pixel in the spectrum image and that is in an image overlapping region between the reconstructed spectrum image and the spectrum image; and
  fusing the plurality of corrected reconstructed spectrum images to generate a corrected color image.

11. The apparatus according to claim 10, wherein the one or more spectrum images comprise spectrum images of N photosensitive bands, the one or more color images comprise M frames of color images, each frame of the M frames of color images has a different exposure amount, the one or more reconstructed spectrum images comprise M×N reconstructed spectrum images, the M×N reconstructed spectrum images comprise spectrum images of N photosensitive bands of each of the M frames of color images, and both N and M are integers greater than or equal to 1, and wherein the fusing the plurality of corrected reconstructed spectrum images to generate a corrected color image comprises:
- fusing, for each of the N photosensitive bands, corrected reconstructed spectrum images of a same photosensitive band in M×N corrected reconstructed spectrum images, to acquire N fused spectrum images; and
- generating the corrected color image based on the N fused spectrum images.

12. The apparatus according to claim 10, wherein the one or more spectrum images comprise spectrum images of N photosensitive bands, the one or more color images comprise M frames of color images, each frame of the M frames of color images has a different exposure amount, the one or more reconstructed spectrum images comprise M×N reconstructed spectrum images, the M×N reconstructed spectrum images comprise spectrum images of N photosensitive bands of each of the M frames of color images, and both N and M are integers greater than or equal to 1, and wherein the fusing the plurality of corrected reconstructed spectrum images to generate a corrected color image comprises:
- generating M intermediate color images based on M×N corrected reconstructed spectrum images; and
- fusing the M intermediate color images to acquire the corrected color image.

13. The apparatus according to claim 11, wherein the correcting comprises:
- correcting, for a pixel value of a spectrum image of each of the N photosensitive bands, pixel values of matched pixels of a same photosensitive band in the M×N reconstructed spectrum images, to acquire M×N corrected reconstructed spectrum images, wherein the plurality of corrected reconstructed spectrum images comprise the M×N corrected reconstructed spectrum images.

14. The apparatus according to claim 13, wherein the correcting, for a pixel value of a spectrum image of each of the N photosensitive bands, pixel values of matched pixels of a same photosensitive band in the M×N reconstructed spectrum images comprises:
- correcting, for the pixel value of the spectrum image of each of the N photosensitive bands, pixel values of matched pixels of a same photosensitive band in effective regions of the M×N reconstructed spectrum images, wherein the effective region is a region that is in a color image and whose pixel value falls within a preset range, and a range of the effective region of the reconstructed spectrum image is the same as a range of an effective region of the color image.

15. The apparatus according to claim 13, wherein the operations further comprise:
- generating, based on the M frames of color images, reconstructed spectrum images of N photosensitive bands of each frame of the M frames of color images by using a reconstruction model, to acquire the M×N reconstructed spectrum images.

16. The apparatus according to claim 15, wherein a parameter of the reconstruction model is determined by training the reconstruction model based on a sample color image and a sample spectrum image and calculating a loss function based on the sample spectrum image and a predicted reconstructed spectrum image output by the reconstruction model, and is determined when the loss function converges and a value of the loss function is less than or equal to a threshold.

17. A non-transitory computer-readable storage medium, wherein the storage medium stores a computer program or instructions, and when the computer program or the instructions are executed, a computer is enabled to perform operations comprising:
- acquiring one or more spectrum images of a first scene by using a first camera;
- acquiring one or more color images of a second scene by using a second camera, wherein the one or more color images and the one or more spectrum images comprise a same target object, and a quantity of photosensitive bands of the first camera is not less than a quantity of photosensitive bands of the second camera;
- correcting one or more color casts of one or more reconstructed spectrum images of the one or more color images based on the one or more spectrum images, to acquire a plurality of corrected reconstructed spectrum images, wherein the correcting one or more color casts of one or more reconstructed spectrum images of the one or more color images based on the one or more spectrum images, to acquire a plurality of corrected reconstructed spectrum images comprises:
  - correcting a pixel value of a matched pixel in a reconstructed spectrum image of the one or more reconstructed spectrum images based on a pixel value of a spectrum image of the one or more spectrum images, to acquire the plurality of corrected reconstructed spectrum images, wherein the matched pixel is a pixel that has a same image feature as a pixel in the spectrum image and that is in an image overlapping region between the reconstructed spectrum image and the spectrum image; and
- fusing the plurality of corrected reconstructed spectrum images to generate a corrected color image.

18. The non-transitory computer-readable storage medium according to claim 17, wherein the one or more spectrum images comprise spectrum images of N photosensitive bands, the one or more color images comprise M frames of color images, each frame of the M frames of color images has a different exposure amount, the one or more reconstructed spectrum images comprise M×N reconstructed spectrum images, the M×N reconstructed spectrum images comprise spectrum images of N photosensitive bands of each of the M frames of color images, and both N and M are integers greater than or equal to 1, and wherein the fusing the plurality of corrected reconstructed spectrum images to generate a corrected color image comprises:
- fusing, for each of the N photosensitive bands, corrected reconstructed spectrum images of a same photosensitive band in M×N corrected reconstructed spectrum images, to acquire N fused spectrum images; and
- generating the corrected color image based on the N fused spectrum images.

19. The non-transitory computer-readable storage medium according to claim 17, wherein the one or more spectrum images comprise spectrum images of N photosensitive bands, the one or more color images comprise M frames of color images, each frame of the M frames of color images has a different exposure amount, the one or more reconstructed spectrum images comprise M×N reconstructed spectrum images, the M×N reconstructed spectrum images comprise spectrum images of N photosensitive bands of each of the M frames of color images, and both N and M are integers greater than or equal to 1, and wherein the fusing the plurality of corrected reconstructed spectrum images to generate a corrected color image comprises:
  generating M intermediate color images based on M×N corrected reconstructed spectrum images; and
  fusing the M intermediate color images to acquire the corrected color image.

20. The non-transitory computer-readable storage medium according to claim 19, wherein the correcting comprises:
  correcting, for a pixel value of a spectrum image of each of the N photosensitive bands, pixel values of matched pixels of a same photosensitive band in the M×N reconstructed spectrum images, to acquire M×N corrected reconstructed spectrum images, wherein the plurality of corrected reconstructed spectrum images comprise the M×N corrected reconstructed spectrum images.

* * * * *